United States Patent
Schaefer et al.

(10) Patent No.: US 10,492,606 B2
(45) Date of Patent: Dec. 3, 2019

(54) PRODUCT HOLDERS FOR SYSTEMS AND METHODS FOR SECURING AND DISPLAYING PRODUCTS

(71) Applicant: iSee Store Innovations, L.L.C., St. Louis, MO (US)

(72) Inventors: Mark Schaefer, Town and Country, MO (US); Steven Allen Brenner, Webster Groves, MO (US); Joseph Vonder Haar, Kirkwood, MO (US); Emad Ayad, Kings Cross (AU)

(73) Assignee: iSee Store Innovations, LLC., St. Louis, MO (US)

( * ) Notice: Subject to any disclaimer, the term of this patent is extended or adjusted under 35 U.S.C. 154(b) by 0 days.

(21) Appl. No.: 16/133,954

(22) Filed: Sep. 18, 2018

(65) Prior Publication Data

US 2019/0021518 A1 Jan. 24, 2019

Related U.S. Application Data

(63) Continuation of application No. 14/623,679, filed on Feb. 17, 2015, now Pat. No. 10,104,986.

(60) Provisional application No. 61/949,679, filed on Mar. 7, 2014, provisional application No. 62/060,223, filed on Oct. 6, 2014.

(51) Int. Cl.
| | |
|---|---|
| A47F 5/08 | (2006.01) |
| A47F 7/28 | (2006.01) |
| A47B 73/00 | (2006.01) |
| F16B 47/00 | (2006.01) |

(52) U.S. Cl.
CPC .............. *A47B 73/008* (2013.01); *A47F 5/08* (2013.01); *A47F 7/283* (2013.01); *F16B 47/00* (2013.01); *Y10T 29/49826* (2015.01)

(58) Field of Classification Search
CPC ................................ A47B 73/008; A47F 5/08
USPC .......................................... 215/399; 248/313
See application file for complete search history.

(56) References Cited

U.S. PATENT DOCUMENTS

| | | | | |
|---|---|---|---|---|
| 1,017,102 | A * | 2/1912 | Kaufman | 211/74 |
| D162,959 | S * | 4/1951 | Janes et al. | D7/620 |
| 3,033,404 | A * | 5/1962 | Adell | A62C 13/78 215/383 |
| 3,033,405 | A * | 5/1962 | Adell | B60S 1/50 215/383 |
| 3,212,660 | A * | 10/1965 | Adell | B60S 1/50 215/383 |
| 3,212,661 | A * | 10/1965 | Adell | B60S 1/50 215/382 |
| 3,224,644 | A * | 12/1965 | Davis | B65D 83/267 222/162 |
| 3,239,181 | A * | 3/1966 | Ellerbrock | B44D 3/14 248/210 |

(Continued)

*Primary Examiner* — Stanton L Krycinski
(74) *Attorney, Agent, or Firm* — Joseph M. Butscher; The Small Patent Law Group, LLC

(57) ABSTRACT

A product holder system is configured to be removably secured to a surface of a component. The system may include a bracket including a main beam and at least one securing mount, and at least one product holder removably and adjustably secured to the main beam. The product holder is configured to removably retain a product. At least one securing assembly is connected to the securing mount(s). The securing assembly is configured to removably secure the product holder system to the surface of the component.

20 Claims, 20 Drawing Sheets

(56) References Cited

U.S. PATENT DOCUMENTS

| | | | | |
|---|---|---|---|---|
| 3,429,542 A * | 2/1969 | Fagan | A62C 13/78 | 211/75 |
| 3,565,384 A * | 2/1971 | Lockwood | A62C 13/78 | 211/85.18 |
| D226,623 S * | 4/1973 | Shuford | | D7/620 |
| 4,324,381 A * | 4/1982 | Morris | E06C 7/146 | 248/311.2 |
| 4,452,415 A * | 6/1984 | Arnold | A47J 47/16 | 248/312.1 |
| 4,606,523 A * | 8/1986 | Statz | A47G 23/0225 | 211/74 |
| 4,708,273 A * | 11/1987 | Grant | A45F 5/02 | 220/741 |
| 4,784,360 A * | 11/1988 | Mok | B60N 3/101 | 248/311.2 |
| 4,848,714 A * | 7/1989 | Ziaylek, Jr. | A62B 9/04 | 248/313 |
| 4,957,254 A * | 9/1990 | Hill | A47G 23/0225 | 248/207 |
| 4,993,675 A * | 2/1991 | Walker | A47G 23/0266 | 220/737 |
| 4,997,157 A * | 3/1991 | Sweeny | A62C 13/78 | 248/310 |
| 5,013,074 A * | 5/1991 | Galle | A47G 23/0241 | 215/395 |
| 5,042,770 A * | 8/1991 | Louthan | A47K 1/09 | 248/205.3 |
| 5,071,100 A * | 12/1991 | Sweeny | A62C 13/78 | 248/310 |
| 5,249,770 A * | 10/1993 | Louthan | A47K 1/09 | 248/205.2 |
| 5,320,263 A * | 6/1994 | Kobylack | A63B 57/203 | 224/274 |
| D379,288 S * | 5/1997 | Azar | | D7/620 |
| 5,709,429 A * | 1/1998 | Bergin | A47C 7/68 | 297/188.04 |
| 5,743,415 A * | 4/1998 | Smart | A45D 20/12 | 211/70.6 |
| 5,842,671 A * | 12/1998 | Gibbs | A47G 23/0225 | 248/231.41 |
| 6,227,511 B1* | 5/2001 | De Costa | A47C 7/62 | 248/311.2 |
| D473,760 S * | 4/2003 | Perez | | D7/620 |
| 6,802,484 B1* | 10/2004 | Kiley | A47G 23/0225 | 248/121 |
| D612,691 S * | 3/2010 | Barnes, Jr. | | D7/620 |
| 7,669,742 B2* | 3/2010 | Rush | A45F 5/00 | 102/336 |
| 8,757,573 B1* | 6/2014 | Barnes, Jr. | A47G 23/0225 | 220/737 |
| 2003/0160060 A1* | 8/2003 | Hornblad | A47F 5/02 | 221/256 |
| 2004/0099624 A1* | 5/2004 | Hein | A47L 13/512 | 311/89.01 |
| 2004/0238577 A1* | 12/2004 | Shivas | A45F 3/16 | 224/148.4 |
| 2007/0210229 A1* | 9/2007 | Brenner | A47G 23/0225 | 248/311.2 |
| 2008/0006592 A1* | 1/2008 | Brooks | A47F 5/0846 | 211/89.01 |

* cited by examiner

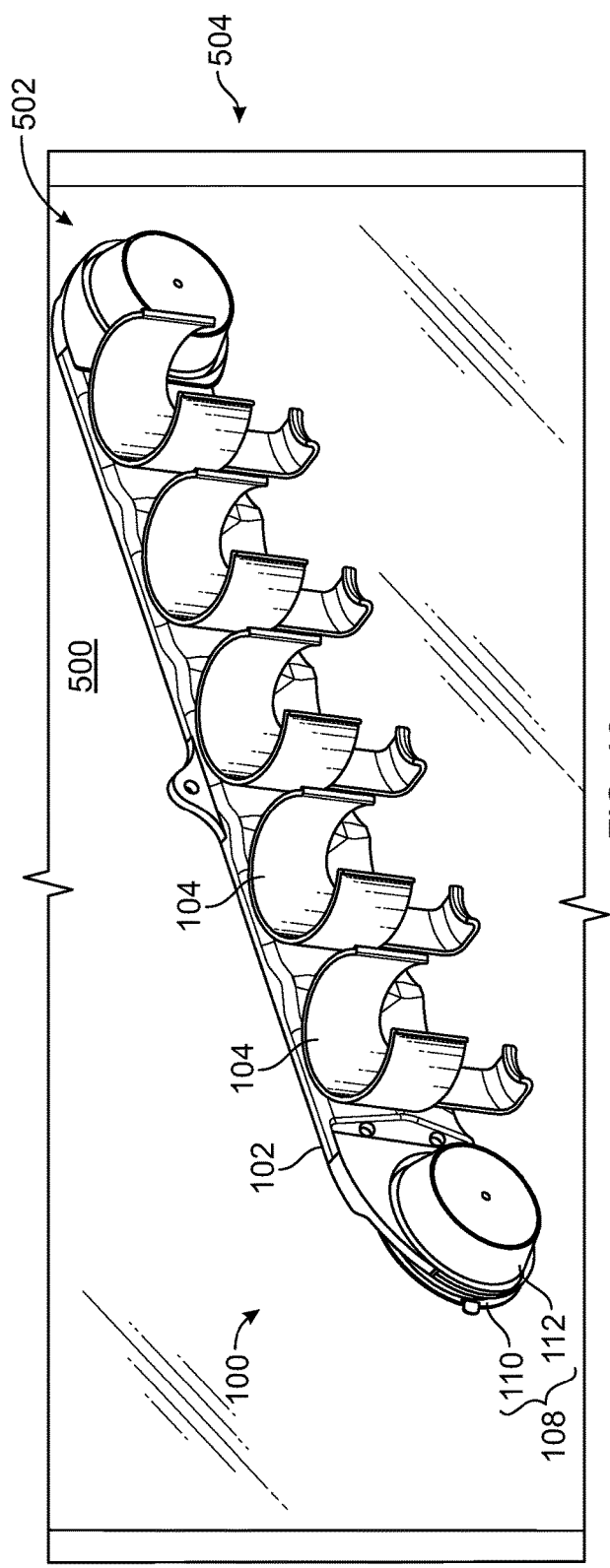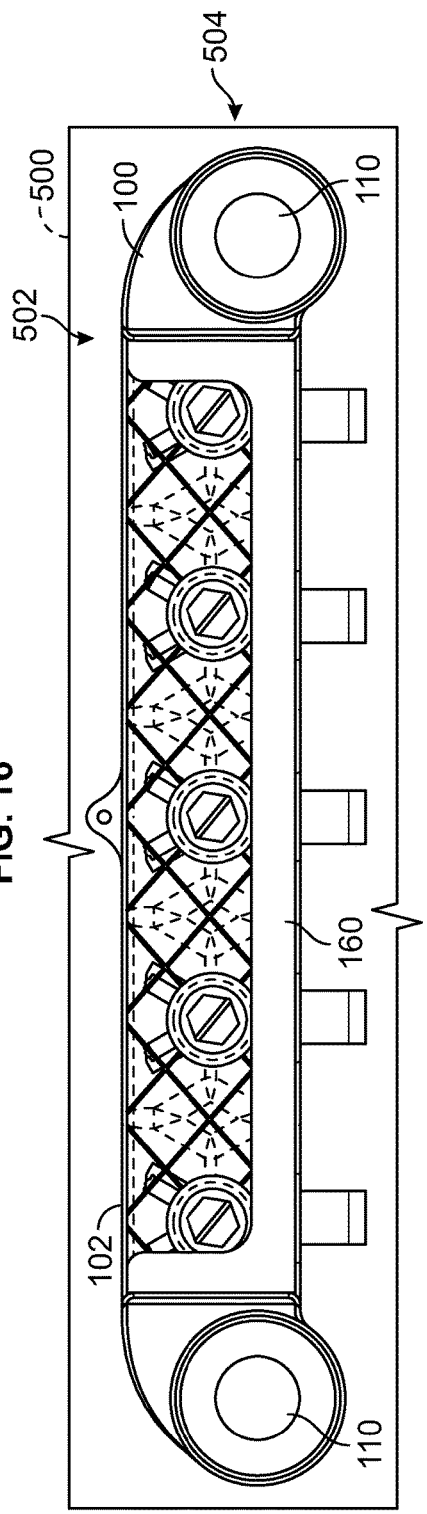

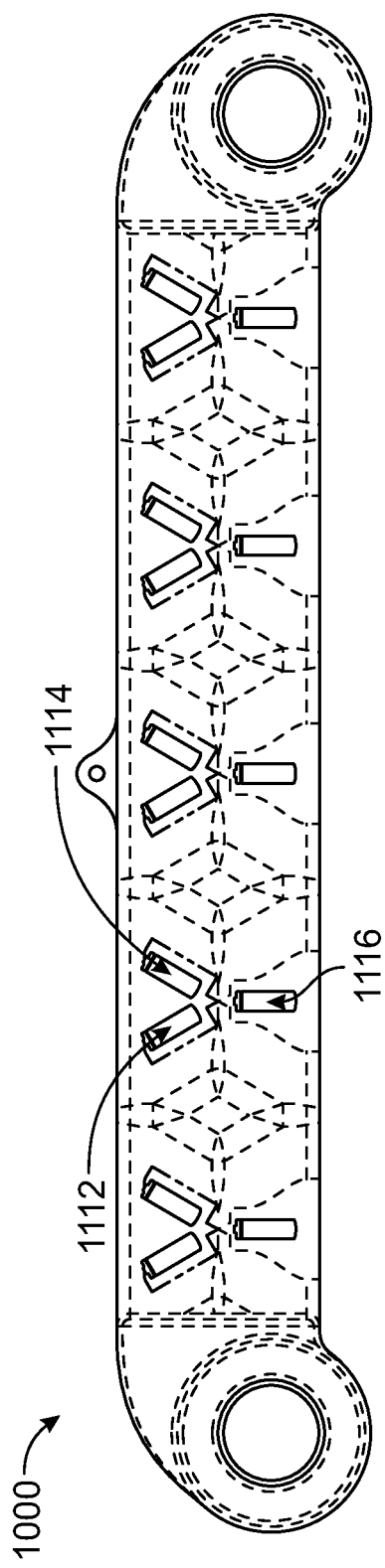
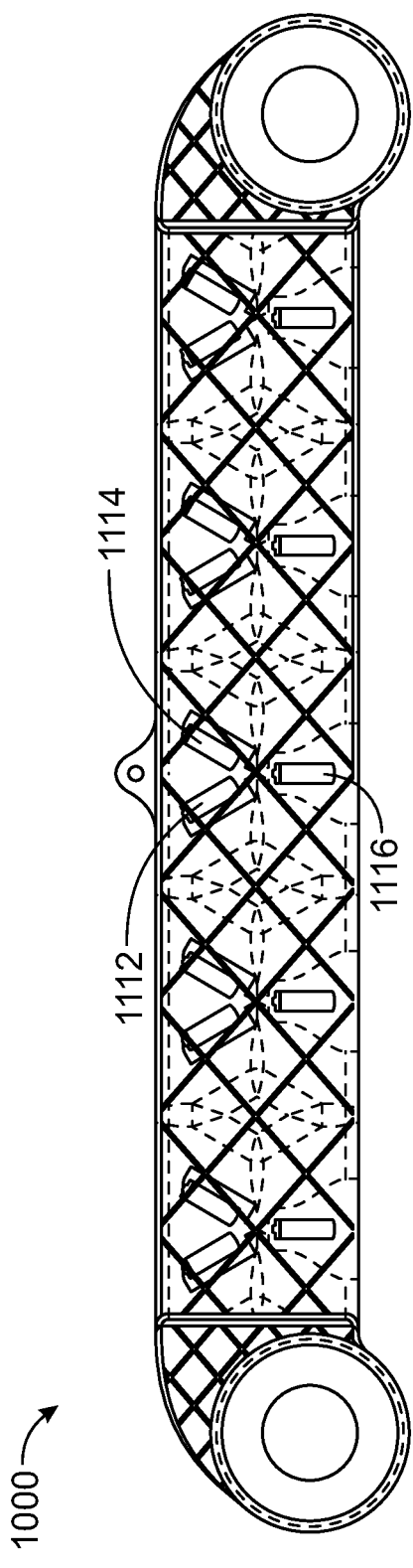
FIG. 21
FIG. 22 ively relate to systems and methods for securing and displaying products, such as systems and methods for reliably, holding, securing, and displaying beverage containers in a variety of positions or orientations within a refrigerated cooler, for example.

PRODUCT HOLDERS FOR SYSTEMS AND METHODS FOR SECURING AND DISPLAYING PRODUCTS

RELATED APPLICATIONS

This application is a continuation of U.S. patent application Ser. No. 14/623,679 entitled "Systems and Method for Securing and Displaying Products," filed Feb. 17, 2015, which relates to and claims priority benefits from U.S. Provisional Patent Application No. 61/949,679 entitled "Systems and Methods for Holding Beverage Containers," filed Mar. 7, 2014, and U.S. Provisional Patent Application No. 62/060,223 entitled "Systems and Methods for Securing and Displaying Products," filed Oct. 6, 2014, all of which are hereby incorporated by reference in their entireties.

FIELD OF EMBODIMENTS OF THE DISCLOSURE

Embodiments of the present disclosure generally relate to systems and methods for securing and displaying products, such as systems and methods for reliably, holding, securing, and displaying beverage containers in a variety of positions or orientations within a refrigerated cooler, for example.

BACKGROUND OF THE DISCLOSURE

Various commercial enterprises offer goods for sale that may be contained within a transparent container. For example, various convenience stores offer refreshments for sale. Some of the refreshments, such as soft drinks, alcoholic beverages, and the like, are refrigerated. Often, the refreshments are contained within a refrigerated compartment having a transparent door (formed of, for example, glass). The transparent door allows a customer to see the types of soft drinks that are available for sale. If the customer chooses to purchase a particular soft drink, the customer opens the door, removes a soft drink within the refrigerated compartment, and then closes the door.

The space within a refrigerated compartment is limited. As such, each refrigerated compartment is able to contain a limited number of products. A known refrigerated compartment includes multiple shelves on which various products are positioned. When the shelf space is fully occupied by a product, additional products are not able to be positioned within the refrigerated compartment. Instead, as products within the refrigerated compartment are removed by customers, additional product may then be moved into the open space on the shelf.

As can be appreciated, the additional product that is not within the refrigerated compartment is stored at other areas of an establishment, thereby taking up valuable space. Further, if a large number of products are removed from the refrigerated compartment, the additional products that are used to replenish the refrigerated compartment take time to cool to a desirable temperature.

Additionally, many establishments have a large number of refrigerated compartments that contain products. With increased numbers of refrigerator compartments, doors, and rows, shelves, and the like, retailers and suppliers may find it difficult to distinguish their products from the hundreds of other products on display.

Accordingly, a need exists for a system and method of accommodating and displaying increased numbers of products within a display container, such as a refrigerated compartment.

SUMMARY OF THE DISCLOSURE

Certain embodiments of the present disclosure provide a system and method of holding products, such as beverage containers, on a compartment door that allows for reliable securement in a variety of positions or orientations. Certain embodiments of the present disclosure provide a product holder system that is configured to be removably secured to a transparent door or any smooth surface. The beverage holder system may include a main body or bracket, at least one securing assembly, and at least one product holder removably and/or adjustably secured to the bracket. The securing assembly may include at least one suction cup that is secured to the bracket and configured to securely connect the product holder system to the transparent door. The beverage holder may be adjustable and/or removably securable with respect to the bracket.

Certain embodiments of the present disclosure provide a product holder system configured to be removably secured to a surface of a component (such as a vertical glass door surface of a refrigerated compartment). The product holder system may be a beverage holder system, for example, and may include a bracket including a main beam and at least one securing mount, at least one product holder removably and adjustably secured to the main beam, wherein the product holder(s) is configured to removably retain a product (such as a beverage can or bottle), and at least one securing assembly connected to the securing mount(s). The securing assembly is configured to removably secure the product holder system to the surface of the component.

The product holder(s) may be configured to be adjustably secured to the main beam in a variety of orientations. For example, the product holder(s) may be secured in a vertical or angled/tilted orientation, and adjusted therebetween. In at least one embodiment, the product holder(s) includes a support base connected to an extension strap that connects to a cradling sleeve, which is configured to securely retain a product, such as a beverage can or bottle.

In at least one embodiment, the product holder(s) may include a bracket-mating stud including a threaded channel and a positioning tab radially extending from the bracket-mating stud. The threaded channel is configured to receive and retain a threaded shaft of a fastener. The positioning tab is configured to be received and retained by one of a plurality of reciprocal positioning keys, such as slots, formed in relation to a fastener through-hole formed in the bracket.

The securing assembly may include at least one suction cup configured to be threadably secured to at least one suction securing nut. The suction cup may include a suctioning base integrally connected to a stem. An outer surface of the stem may be threaded. In at least one other embodiment, the stem may also be keyed, notched, or channeled in order to permit proper orientation of product-holding devices. The suction securing nut may include an outer shroud having an outer circumferential wall connected to an outer cap, and an interior connecting tube extending inwardly from an interior surface of the cap. The interior connecting tube may include an interior threaded surface surrounding a central chamber. An outer surface of the cap may support one or more graphical displays, such as an advertisement, product information, pricing information, and/or the like. One or both of the securing mount(s) and the securing assembl(ies) may include at least one ratchet surface configured to prevent the securing assembly from being over-tightened.

The main beam of the bracket may include recessed valleys between peaks. A product holder is removably and adjustably secured within one of the valleys. Each of the peaks may be diamond-shaped.

The bracket may include a support web that provides one or both of strength and rigidity to the bracket while reducing a weight of the bracket. In at least one embodiment, the bracket includes a graphics insert holder configured to retain a graphics display that is configured to show through the surface of the component.

The system may be part of a modular system or assembly. For example, at least one additional product holder system may modularly connect to the product holder system.

Certain embodiments of the present disclosure provide a method of securing a plurality of products to a vertical transparent surface of a compartment, which may or may not be refrigerated. The method may include removably securing a plurality of product holders to a main beam of a bracket, positioning a plurality of securing assemblies with respect to plurality of securing mounts of the bracket, securely connecting the plurality of securing assemblies to the vertical transparent surface of the refrigerated compartment, inserting a plurality of products within the plurality of product holders, and positioning the plurality of products inserted within the plurality of product holders within a refrigerated chamber of the refrigerated compartment.

Certain embodiments of the present disclosure provide a securing assembly configured to removably secure a structure to a surface of a component. The securing assembly may include a suction cup including a suctioning base integrally connected to a stem having a first threaded surface, and a suction securing nut including an outer shroud having an outer circumferential wall connected to an outer cap, and an interior connecting tube having a second threaded surface that is configured to threadably engage the first threaded surface of the stem. Rotation of the suction securing nut into a securing relationship with respect to the suction cup increases a suctioning securing force exerted into the surface of the component by the suctioning base. In at least one embodiment, the stem may include one or more keying members configured to maintain the structure at a desired orientation in relation to the surface of the component.

BRIEF DESCRIPTION OF THE DRAWINGS

FIG. 16 illustrates a perspective front view of a product holder system secured to an interior surface of a glass door of a refrigerated compartment, according to an embodiment of the present disclosure.

FIG. 17 illustrates a rear view of a product holder system secured to an interior surface of a glass door of a refrigerated compartment, according to an embodiment of the present disclosure.

FIG. 21 illustrates a front view of a bracket, according to an embodiment of the present disclosure.

FIG. 22 illustrates a rear view of a bracket, according to an embodiment of the present disclosure.

DETAILED DESCRIPTION OF THE DISCLOSURE

Figure 1:
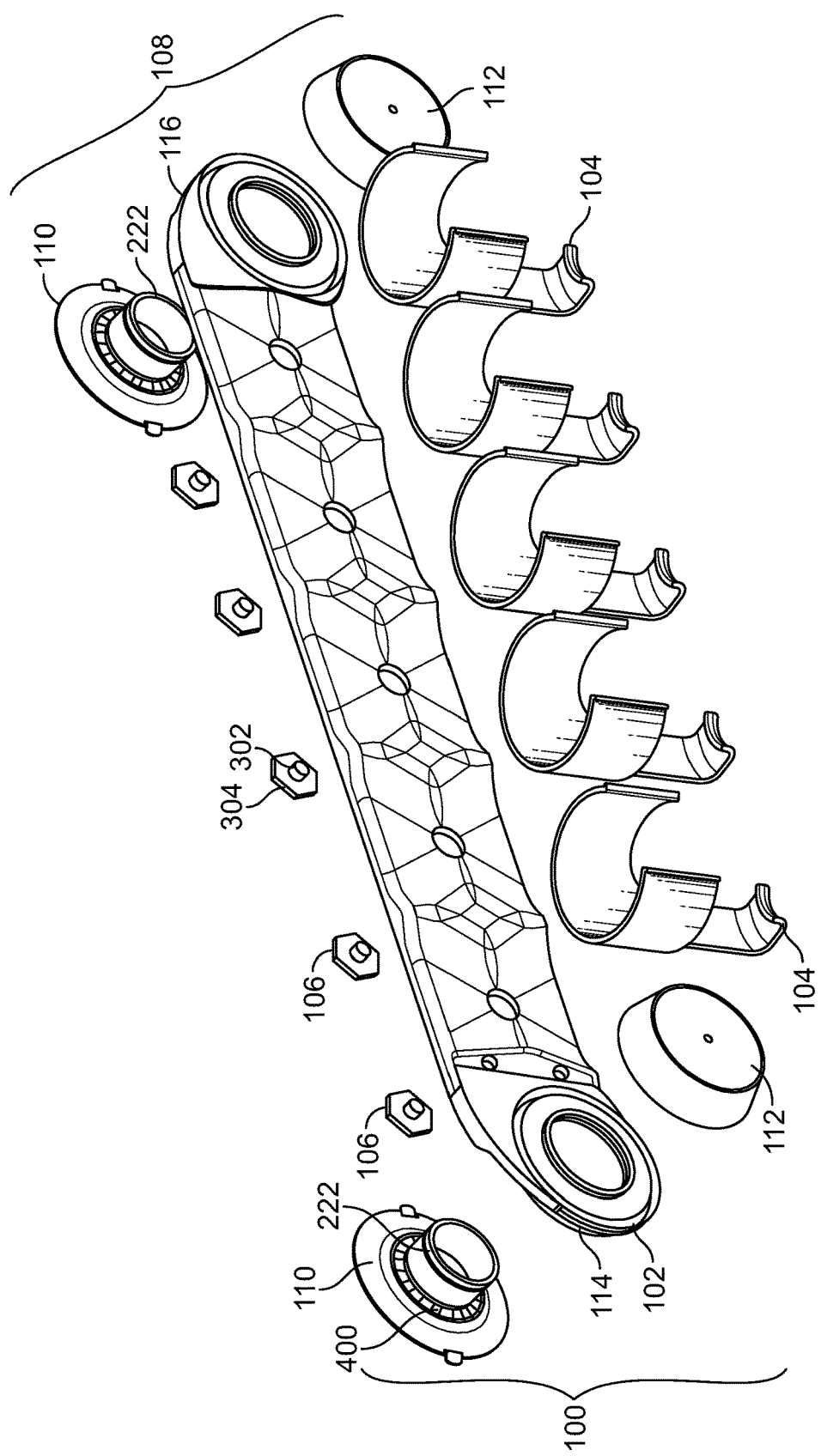
FIG. 1 illustrates a perspective front exploded view of a product holder system, according to an embodiment of the present disclosure.

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide a product holder system, such as a beverage holder system, which may be a modular system, for example. The product holder system may be securable to a door, for example an inside of a glass walk-in cooler door. The product holder system may be removably securable to the door via one or more securing assemblies, which may include one or more high strength suction cups. In at least one embodiment, a product holder system may be configured to retain up to five cans of 32 ounces, for example, each within product holders connected to a single main body or bracket supported by two securing assemblies. In other embodiments, a product holder system may be configured to retain ten 32 ounce or larger cans using two brackets (or, put another way, a main body having two portions) and three securing assemblies. The product holders may be configured to securely hold beverage containers, such as cans or bottles. Alternatively, the product holders may be configured to hold different objects having various widths, diameters, sizes, and shapes.

The orientation of the products, such as beverage cans or bottles, held by the system may be selectable and/or adjustable. For example, beverage containers may be displayed in a vertical orientation (for example, with the top of the beverage container oriented upward relative to the horizon). Alternatively, beverage containers may be displayed at an angle (for example, tilted with respect to the vertical orientation). The product holder system may be adjustable to provide for switching or changing between product orientations.

The product holder assembly may be mounted to a door horizontally (for example, generally parallel to the horizon), vertically (for example, generally perpendicular to the horizon), or at a tilt angle between vertical and horizontal. Further, two or more units or bodies may be joined to provide for a longer (or taller) system, or to provide a "V" shape or an inverted "V" shape, among others.

In at least one embodiment, the product holder system may include a graphics display facing a door to which the system is secured. The graphics display may be used to provide advertising, identify or provide additional details regarding a product retained and displayed by the system, or the like.

In various embodiments, a securing assembly may include a suction cup that may be secured to a bracket via a threaded knob that passes through an opening of the main body and is accepted by a nut. The tightening of the nut may act to pull the main body (or a portion thereof) on to the suction cup, and may serve to increase the suction provided by the suction cup. The nut and threaded knob may be coupled via a ratcheting or other torque limiting mechanism to prevent over-tightening.

The product holders may be removably secured to the bracket. For example, the product holders may include resiliently biasable members with barbed ends that may be snapably or otherwise releasably accepted by notches of the bracket. A given product holder may thus be inserted into a given notch to provide a given orientation, and later released and inserted into a different notch to provide a different orientation. As another example, a product holder may be removed from a notch and replaced with a differently sized and/or shaped product holder (for example, a product holder configured to accept a different sized and/or shaped can or bottle).

FIG. 1 illustrates a perspective front exploded view of a product holder system 100, according to an embodiment of the present disclosure. The product holder system 100 may include a main body or bracket 102 that securely and adjustably holds one or more product holders 104. Fasteners 106 securely connect the product holders 104 to the bracket 102. As such, the product holders 104 may be removably connected to the bracket 102 through the fasteners 106. The fasteners 106 are configured to allow the product holders 104 to be selectively removed and secured to the bracket 102 in a variety of orientations. One or more securing assemblies 108 are configured to secure the product holder system 100 to a surface, such as a glass surface, a mirror, and/or the like. Each securing assembly 108 may include a suction cup 110 that threadably connects to a suction securing nut 112.

While the product holder system 100 is shown having five product holders 104, more or less product holders 104 may be used. For example, the bracket 102 may hold one, two, three, four, six, or more product holders 104. The bracket 102 may be sized differently than shown, as well. For example, the bracket 102 may be long enough to accommodate six or more product holders 104, or may be shorter to accommodate less than five product holders 104.

Also, more or less securing assemblies 108 than shown may be used to secure the product holder system 100 to a surface. For example, the product holder system 100 may include only one securing assembly 108 at a mid-section of the bracket 102. However, using two securing assemblies 108 at opposite ends 114 and 116 of the bracket 102 stabilizes the product holder system 100 with respect to a surface, such as an interior glass surface of a door of a refrigerated compartment. Alternatively, the product holder system 100 may include three or more securing assemblies positioned at various areas of the bracket 102.

Figure 2:
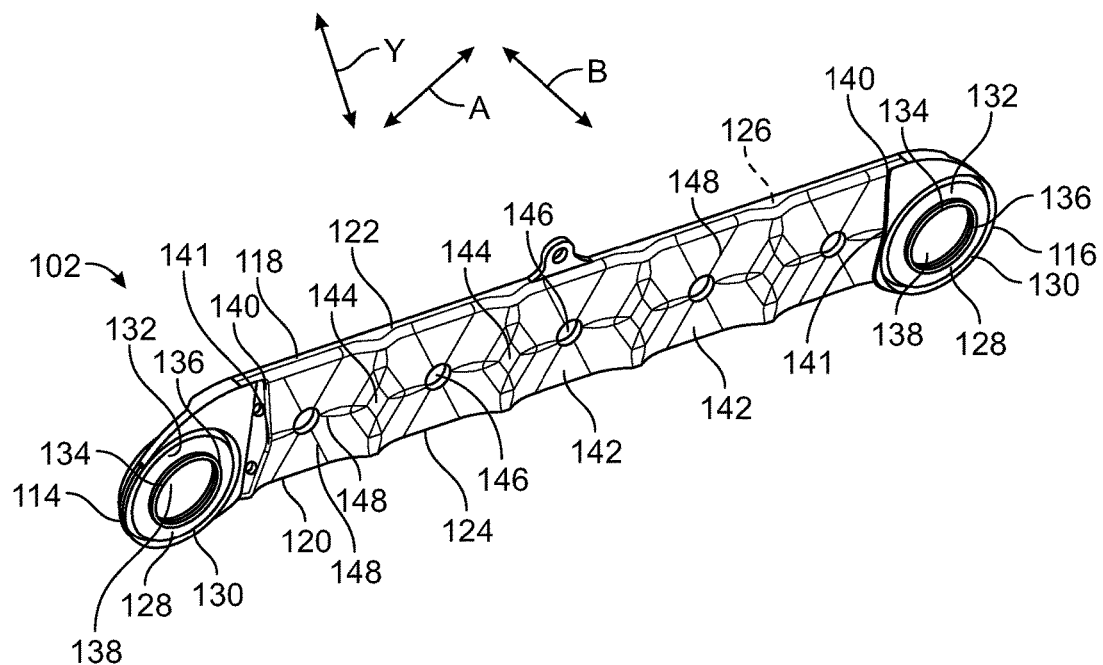
FIG. 2 illustrates a perspective front view of a bracket, according to an embodiment of the present disclosure.

FIG. 2 illustrates a perspective front view of the bracket 102, according to an embodiment of the present disclosure. The bracket 102 may be formed of a rigid material, such as plastic, metal, and, or the like. The bracket 102 includes a main beam 118 that extends between the terminal ends 114 and 116. The main beam 118 includes a front face 120 connected to upper and lower edges 122 and 124, respectively, which, in turn, connect to a rear surface 126.

A securing mount 128 is positioned at each end 114 and 116. Each securing mount 128 may include an annular wall 130 surrounding a flat annular rim 132. The annular wall 130 outwardly extends from the annular rim 132. For example, the annular wall 130 may be a circumferential wall that is perpendicular to the surface of the rim 132. The annular rim 132, in turn, may surround an interior annular wall 134 having an inner ratchet surface 136 that surrounds a circular passage 138. Each securing mount 128 is configured to cooperate with a securing assembly 108, which is configured to secure the bracket 102 to a surface, such as an interior glass surface of a door of a refrigerated compartment.

Alternatively, the securing mounts 128 may be sized and shaped differently than shown. For example, the securing mounts 128 may or may not include the outwardly extending walls, as shown. Further, the securing mounts 128 may not include the inner ratchet surfaces.

Outwardly-extending fins 140 may separate the securing mounts 128 from the main beam 118. Each fin 140 may be a planar member, such a tab, or the like, having an arcuate outer edge 141. The fins 140 may provide bracing strength to the bracket 102 and are configured to provide a barrier between the securing mounts 128 and the main beam 118. Alternatively, the bracket 102 may not include the fins 140.

The product holders 104 (shown in FIG. 1) are configured to be mounted on the front face 120 of the main beam 118. The front face 120 may include recessed areas, depressions, or valleys 142 separated by raised boundaries or peaks 144. As shown, each peak 144 may be generally diamond-shaped. Stud-retainer holes 146 are formed through a center of each valley 142. Linear braces 148 radially extend outward from each stud-retainer hole 146. Alternatively, the front face 120 may not include the valleys 142 and peaks 144, but instead may be a generally flat surface.

The diamond-shaped peaks 144 may be configured to support the product holders 104 (shown in FIG. 1) in orientations along axes that are parallel to the Y axis, as well as tilted angles that are parallel with the titled axes A and B. For example, each product holder 104 may be adjusted between angles A and B, and the raised peaks 144 may abut against a portion of each product holder 104 to securely support the product holder 104 in position.

Figure 3:
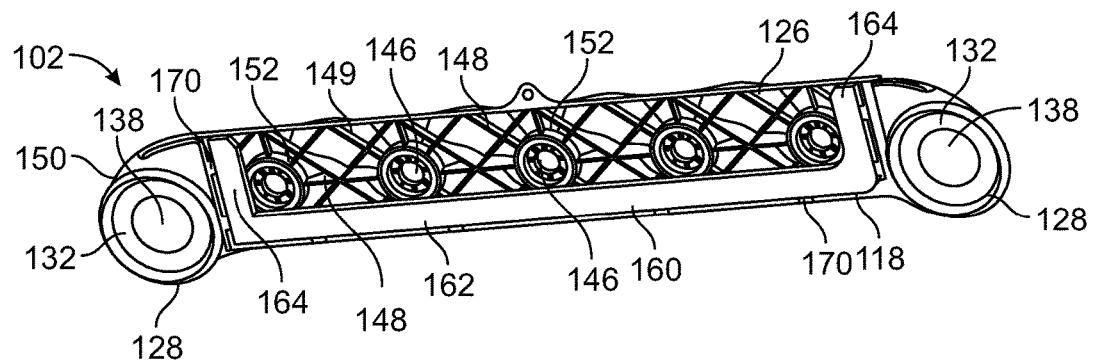
FIG. 3 illustrates a perspective rear view of a bracket, according to an embodiment of the present disclosure.

FIG. 3 illustrates a perspective rear view of the bracket 102, according to an embodiment of the present disclosure. As shown, rear surfaces of each securing mount 128 may include an annular wall 150 that may be aligned with the annular wall 130 (shown in FIG. 2). Strengthening annular ridges 152 may extend around each stud-retainer hole 146 and are configured to provide bracing strength to the stud-retainer holes 146 (so as not to deform when studs are secured therein).

As shown, the linear braces 148 provide a bracing lattice or support web 149 through the main beam 118. The bracing lattice or support web 149 formed by the linear braces 148 supports and braces the bracket 102 so as to safely and reliably support the weight of product held by the product holder system 100 (shown in FIG. 1). Alternatively, the bracket 102 may not include the bracing lattice or support web.

The linear braces 148, such as ribs, beams, fins, and, or the like, provide the bracing lattice or support web 149, which provides rigidity and/or strength to the bracket 102 while minimizing or otherwise reducing weight and/or material required for the bracket 102. The support web 149 may be configured in an aesthetically pleasing arrangement. All or a portion of the support web 149 may be covered by a sign, cover, or the like.

The rear surface 126 of the bracket 102 may also include a planar graphics insert holder 160 behind the bracing lattice or support web 149. The graphics insert holder 160 is configured to support a graphics display or sign, such as an advertisement or product information sheet, between the rear surface 126 and a surface, such as an interior glass surface, of a component or device, such a refrigerated compartment, to which the bracket 102 is secured.

Figure 4A:
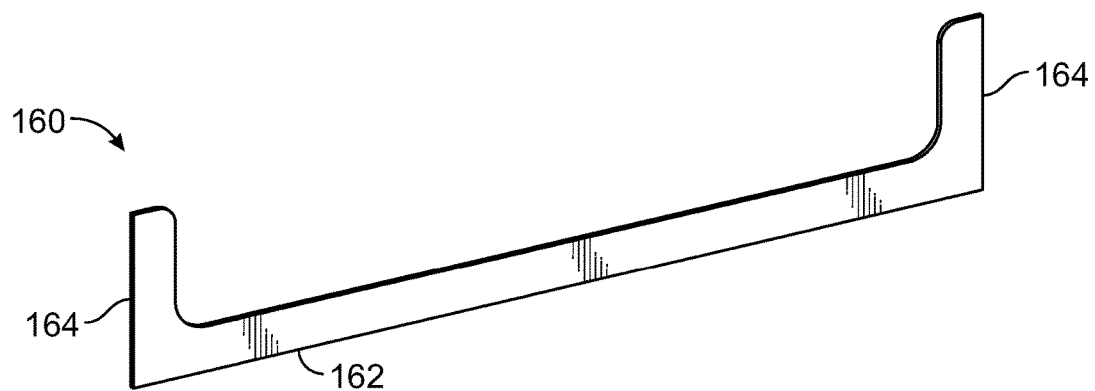
FIG. 4A illustrates a perspective front view of a graphics insert holder, according to an embodiment of the present disclosure.

FIG. 4A illustrates a perspective front view of the graphics insert holder 160, according to an embodiment of the present disclosure. The graphics insert holder 160 includes a planar cross beam 162 connected to upstanding end beams 164. The graphics insert holder 160 may be integrally molded and formed with the bracket 102 (shown in FIGS. 1-3). Alternatively, the graphics insert holder 160 may be a separate and distinct piece that is inserted into the bracket 102. Also, alternatively, the product holder system 100 may not include a graphics insert holder.

Figure 4B:
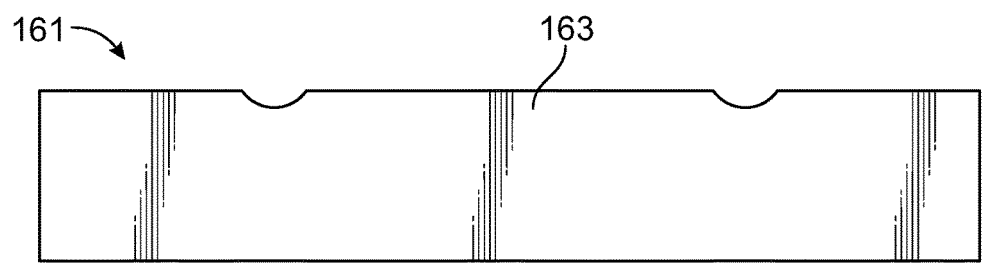
FIG. 4B illustrates a front view of a sign, according to an embodiment of the present disclosure.
Figure 4C:
FIG. 4C illustrates a top view of a sign, according to an embodiment of the present disclosure.

FIG. 4B illustrates a front view of a graphics insert 161 (such as a sign), according to an embodiment of the present disclosure. FIG. 4C illustrates a top view of the graphics insert 161. The graphics insert 161 may be a planar sheet of material, such as paper, or plastic. The graphics insert 161 may include a graphics display, such as an advertisement, product information, pricing information, or various other data, on a display face 163. The graphics insert 161 may be a graphics sheath, for example, that is formed of a clear polycarbonate configured to accept a decal or other graphic affixed to a portion of the graphics sheath while still allowing for visibility of at least a portion of the support web 149 of the bracket 102. Optionally, the graphics insert 161 may be sized and shaped to cover the support web 149 of the bracket 102.

Referring again to FIG. 3, the graphics insert holder 160 may be secured into a slot formed in the rear surface 126 and retained by one or more clips 170 that extend over portions of the cross beam 162 and/or the end beams 164. The graphics insert 161 may be securely pinched between the graphics insert holder 160 and the clips 170. The graphics insert 161 may be configured to abut into the surface of the component (such as a clear door of a refrigerated compartment).

Figure 5:
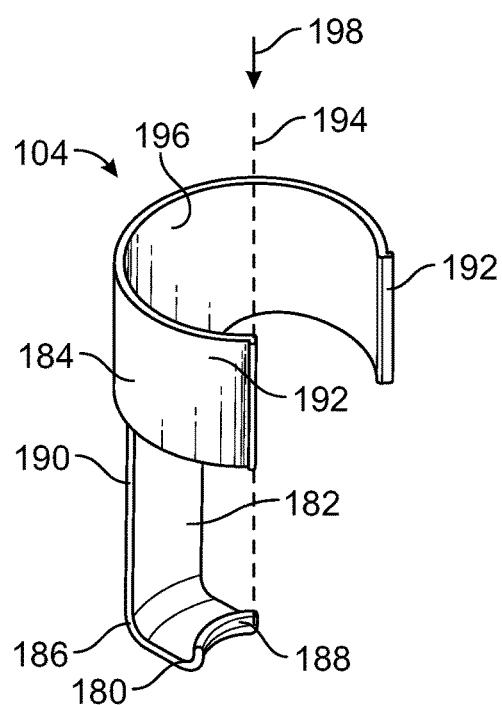
FIG. 5 illustrates a perspective front view of a product holder, according to an embodiment of the present disclosure.

FIG. 5 illustrates a perspective front view of the product holder 104, according to an embodiment of the present disclosure. The product holder 104 may be configured to securely retain and hold a can or bottle, such as a beverage can or holder. The product holder 104 may be formed of plastic, for example.

The product holder 104 may include a support base 180 connected to an extension strap 182, which, in turn, connects to a cradling sleeve 184. The support base 180 may include a flat beam 186 connected to an upturned distal tip 188. The extension strap 182 may include an arcuate bowed surface 190 that may generally conform to an outer curved surface of a can or bottle. The cradling sleeve 184 may include opposed resilient arms 192, such as leaf springs, spring beams, or the like that are configured to flex outwardly and inwardly with respect to a central axis 194 between the arms 192. Alternatively, the product holder 104 may be sized and shaped differently than shown.

In operation, a product, such as a beverage can or bottle, is positioned into the product holder 104 such that a bottom portion is supported by the support base 180 (such as being propped up by the distal tip 188). At least a portion of an outer surface of the product may be removably secured within the cradling sleeve 184. For example, as the product is pushed into the cradling sleeve 184 between the arms 192, the arms flex outwardly to allow the product to be inserted therein. As the product abuts into an interior wall surface 196 of the cradling sleeve 184, the arms 192 return to their at-rest positions, thereby securely trapping the product therein. Optionally, the product may simply be slid down into the product holder 104 in the direction of arrow 198.

Figure 6:
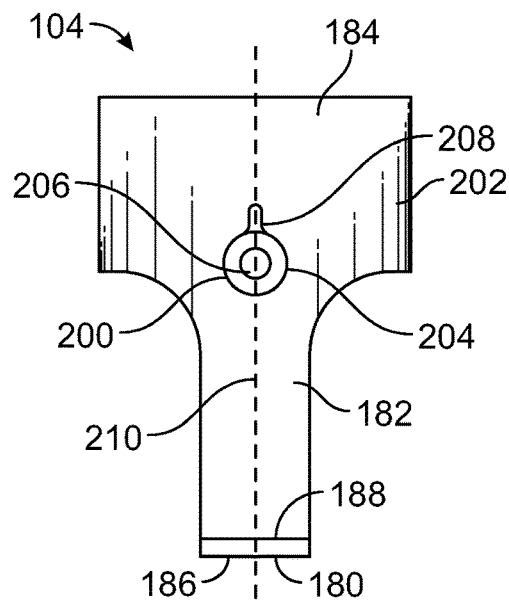
FIG. 6 illustrates a rear view of a product holder, according to an embodiment of the present disclosure.

FIG. 6 illustrates a rear view of the product holder 104, according to an embodiment of the present disclosure. A bracket-mating stud 200 may outwardly extend from an outer surface 202 of the cradling sleeve 184. As shown, the bracket-mating stud 200 may include a cylindrical post 204 defining a central threaded channel 206. The cylindrical post 204 is configured to be retained within a stud retainer hole 146 (shown in FIGS. 2 and 3). The central threaded channel 206 is configured to receive and threadably retain a threaded shaft of a fastener 106 (shown in FIG. 1). A positioning tab 208 extends upwardly from the post 204. The positioning tab 208 is configured to be received and retained by a reciprocal slot formed over a fastener through-hole formed in the bracket 102.

As shown, the bracket-mating stud 200 may be aligned with respect to a central spine 210 of the product holder 104. Alternatively, the bracket-mating stud 200 may be positioned at various other areas of the product holder 104.

Figure 7:
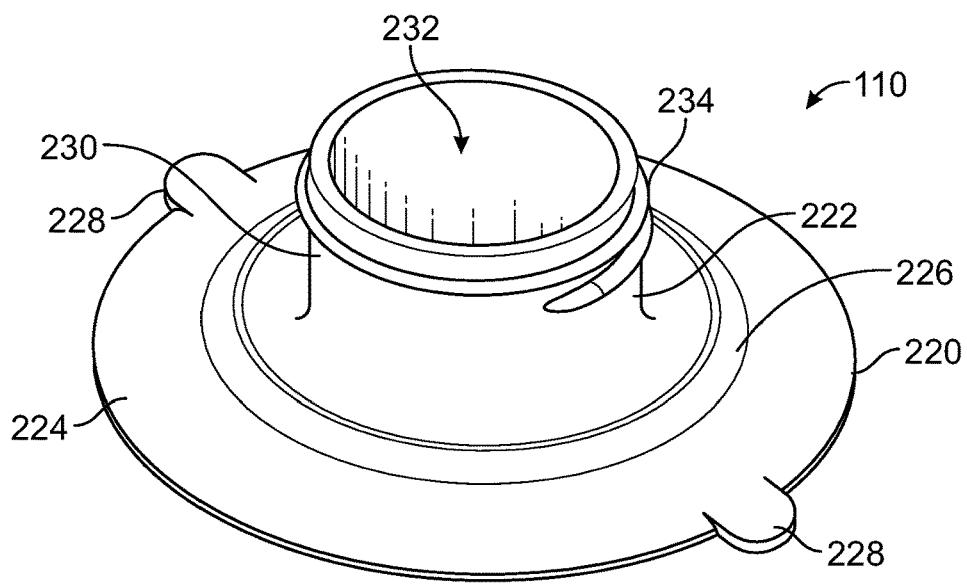
FIG. 7 illustrates a perspective top view of a suction cup, according to an embodiment of the present disclosure.
Figure 8:
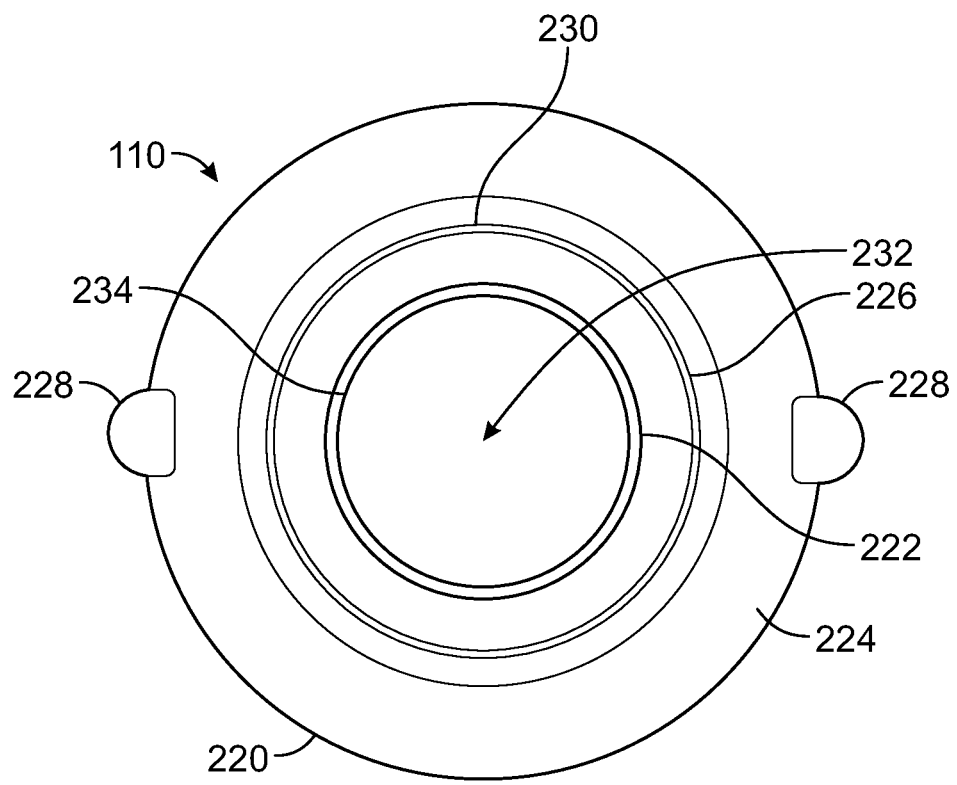
FIG. 8 illustrates a top view of a suction cup, according to an embodiment of the present disclosure.
Figure 9:
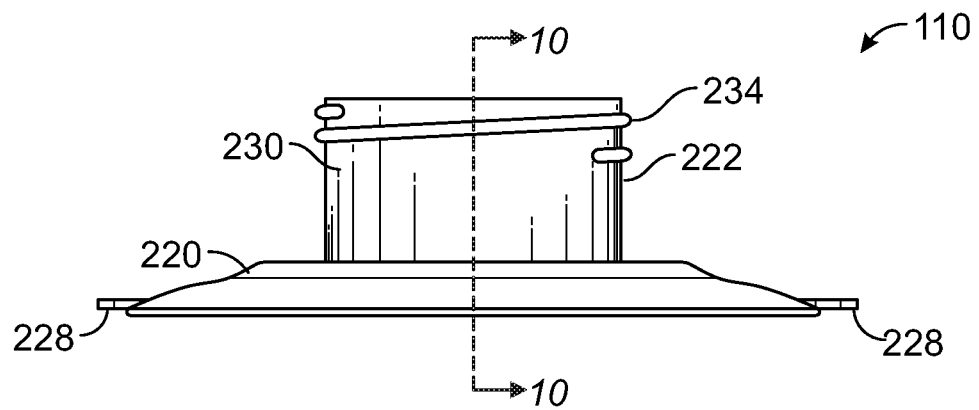
FIG. 9 illustrates a lateral view of a suction cup, according to an embodiment of the present disclosure.
Figure 10:
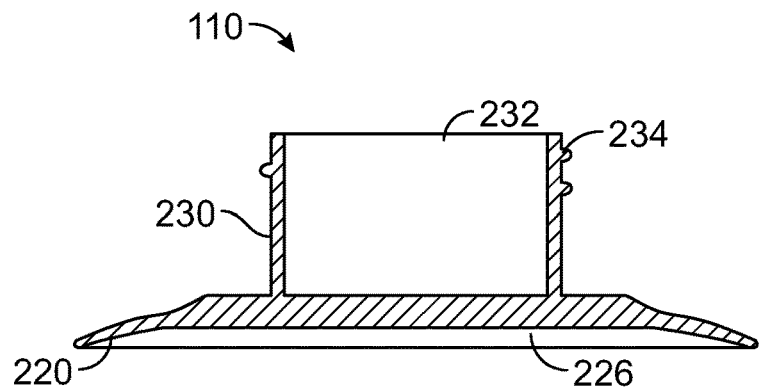
FIG. 10 illustrates a cross-sectional view of a suction cup through line 10-10 of FIG. 9, according to an embodiment of the present disclosure.
Figure 11:
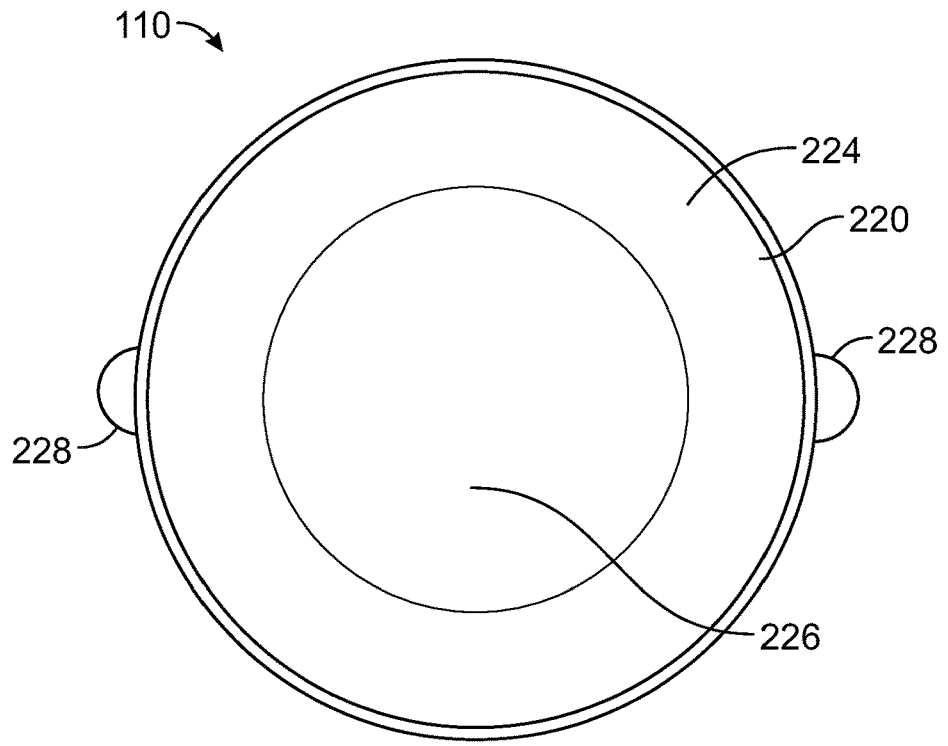
FIG. 11 illustrates a bottom view of a suction cup, according to an embodiment of the present disclosure.

FIG. 7 illustrates a perspective top view of a suction cup 110, according to an embodiment of the present disclosure. FIG. 8 illustrates a top view of the suction cup 110. FIG. 9 illustrates a lateral view of the suction cup 110. FIG. 10 illustrates a cross-sectional view of the suction cup 110 through line 10-10 of FIG. 9. FIG. 11 illustrates a bottom view of the suction cup 110.

Referring to FIGS. 7-11, the suction cup 110 includes a suctioning base 220 integrally connected to a stem 222 extending upwardly from the suctioning base 220. The suctioning base 220 may include an outer annular lip 224 surrounding a flattened interior circular body 226. Pull tabs 228 may extend radially outward from outer edges of the annular lip 224. The pull tabs 228 are configured to be pulled outwardly from a surface to remove the suction cup 110 therefrom.

The stem 222 includes a cylindrical shaft 230 surrounding a central channel 232 that extends to the suctioning base 220. An outer surface of the shaft 230 may include threads 234 that are configured to threadably engage interior threads of a suction securing nut 112.

Figure 12:
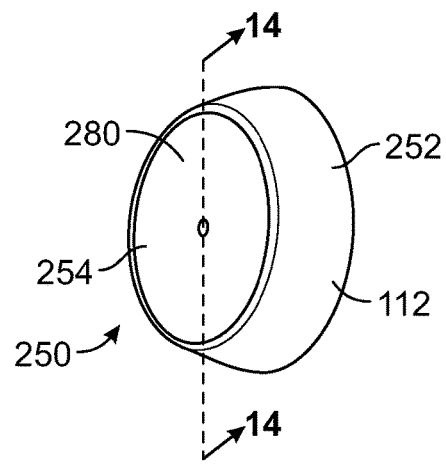
FIG. 12 illustrates a perspective front view of a suction securing nut, according to an embodiment of the present disclosure.
Figure 13:
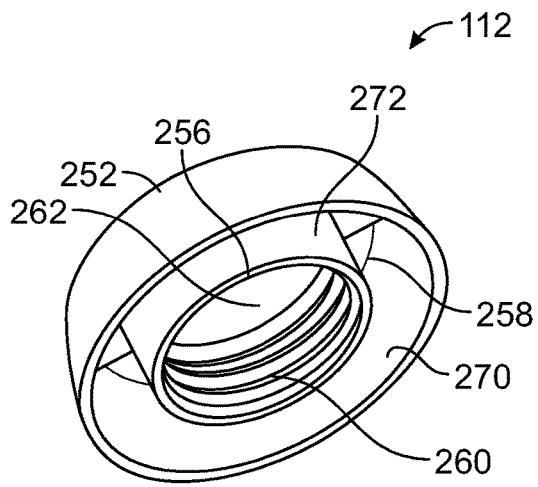
FIG. 13 illustrates a perspective rear view of a suction securing nut, according to an embodiment of the present disclosure.
Figure 14:
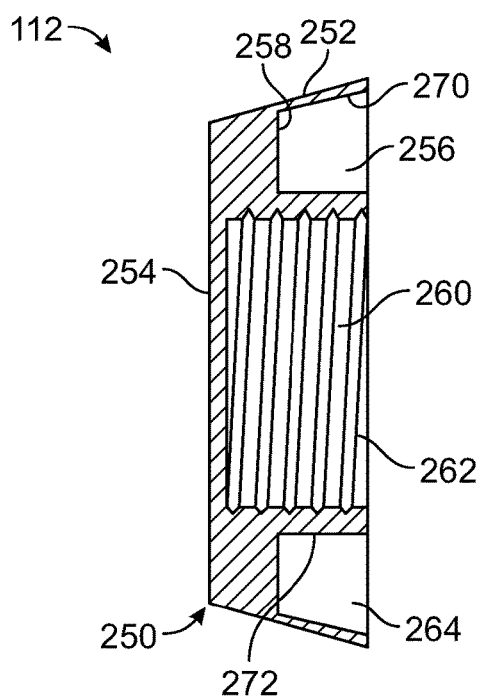
FIG. 14 illustrates a cross-sectional view of a suction securing nut through line 14-14 of FIG. 12, according to an embodiment of the present disclosure.

FIG. 12 illustrates a perspective front view of a suction securing nut 112, according to an embodiment of the present disclosure. FIG. 13 illustrates a perspective rear view of the suction securing nut 112. FIG. 14 illustrates a cross-sectional view of the suction securing nut 112 through line 14-14 of FIG. 12.

Referring to FIGS. 12-14, the suction securing nut 112 includes an outer shroud 250 having an outer circumferential wall 252 connected to an outer cap 254. An interior connecting tube 256 extends inwardly from an interior surface 258 of the cap 254. The connecting tube 256 includes an interior threaded surface 260 surrounding a central chamber 262. An outer channel 264 is defined between an interior surface 270 of the wall 252 and an outer surface 272 of the connecting tube 256.

An outer surface 280 of the cap 254 may be configured to support one or more graphics, such as advertisements, information, or the like. For example, a graphics display may be formed on the outer surface 280 of the cap 254. The graphics display may provide information, advertisements, and/or the like for the products being held by the product holder system 100 (shown in FIG. 1). In at least one embodiment, graphics displays may be directly formed, etched, written, adhesively secured, and/or the like onto the outer surface 280 of the cap 254. In at least one other embodiment, a clear pocket may be formed over the outer surface 280, and the graphics display may be formed on a sheet of plastic, paper, or the like that is inserted between the outer surface 280 and an interior surface of the clear pocket.

Referring to FIGS. 8-14, the suction cup 110 and the suction securing nut 112 may form a securing assembly, such as the securing assembly 108 shown in FIG. 1. In order to secure the suction cup 110 to a surface, the suctioning base 220 is positioned on the surface, such as a glass surface of a refrigerated compartment door. The connecting tube 256 is then aligned over the stem 222 of the suction cup 110. The connecting tube 256 is then urged onto the stem 222, so that that the internal threads 260 of the connecting tube 256 engage the outer threads 234 of the stem 222. As the connecting tube 256 is rotated into a securing position with the stem 222, the suctioning force exerted by the suctioning base 220 increases, thereby increasing the securing force between the securing assembly 108 and the surface of the component to which the securing assembly 108 secures. It has been found that by threadably engaging the suction cup 110 with the suction securing nut 112 into a secure position, increased suction retaining force is achieved with the surface of the component, such as a glass surface of a refrigerated compartment door. The resulting suctioning force achieved by the threaded engagement of the suction securing nut 112 with the suction cup 110 exceeds that of a standard suction cup that is merely linearly pressed into a surface of a component.

Alternatively, the stem 222 of the suction cup 110 may include an interior threaded surface that threadably receives and engages an outer threaded surface of a connection tube of the suction securing nut 112.

Figure 29:
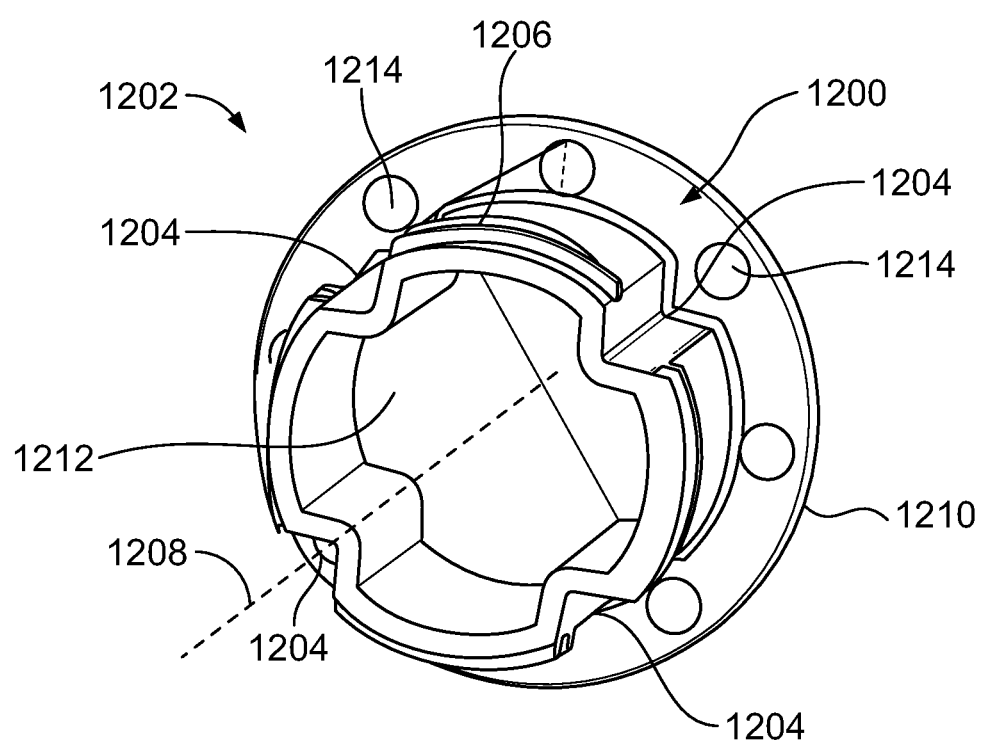
FIG. 29 illustrates a perspective top view of a stem of a suction cup, according to an embodiment of the present disclosure.

FIG. 29 illustrates a perspective top view of a stem 1200 of a suction cup 1202, according to an embodiment of the present disclosure. The suction cup 1202 is similar to the suction cup 110 described above. However, as shown, keying members 1204 are formed through the stem 1200. Outer surfaces of the stem 1200 may include threads 1206, as described above. The keying members 1204 may be channels, indentations, divots, recessed areas, notches, slots, or the like, formed in an outer surface of the stem 1200. Each keying member 1204 may be formed along a height of the stem 1200 and may be parallel to a central axis 1208 of the stem 1200. As shown, four evenly-spaced keying members 1204 are shown. Alternatively, more or less keying members than shown may be used.

The keying members 1204 provide alignment keys that are configured to receive reciprocal structures formed on a component, such as an accessory, bracket or the like, in order to maintain the component in a desired position. For example, the securing mounts 128 (shown in FIG. 2, for example) may include inwardly directed tabs extending into the passages 138. The tabs may be retained within the keying members 1204 to securely maintain the product holder system 100 at a desired orientation.

Additionally, a flange 1210 radially extends from a base 1212 of the stem 1200. The flange 1210 may include one or more holes 1214 formed therethrough. More or less holes than shown may be used. A suctioning base (such as the suctioning base 220) may be secured over or otherwise onto the flange 1210. The holes 1214 are configured to allow the flexible material of the suctioning base to flow around and through the flange 1210, thereby providing an increased retaining interface, as well as providing a greater degree of flexibility to the suctioning base.

Figure 30:
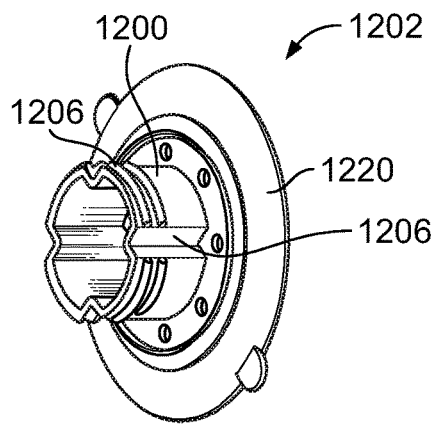
FIG. 30 illustrates a perspective view of a suction cup, according to an embodiment of the present disclosure.
Figure 31:
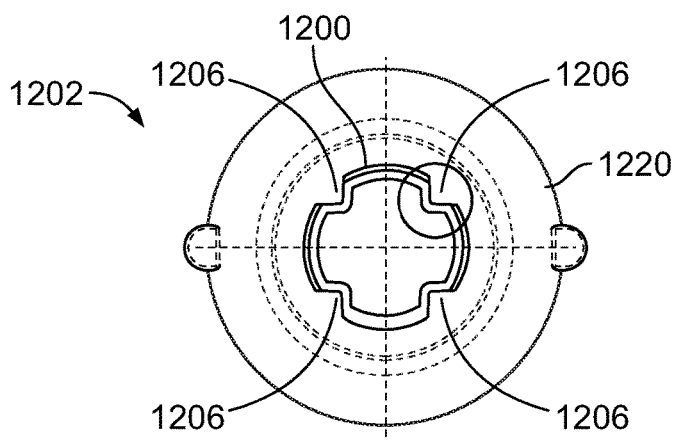
FIG. 31 illustrates a top view of a suction cup, according to an embodiment of the present disclosure.

FIG. 30 illustrates a perspective view of the suction cup 1202, according to an embodiment of the present disclosure. FIG. 31 illustrates a top view of the suction cup 1202. As shown, the suctioning base 1220 is secured to the stem 1200. The threads 1206 are formed on an outer surface of the stem 1200, while the keying members 1204 are formed through portions of the stem 1200.

Figure 32:
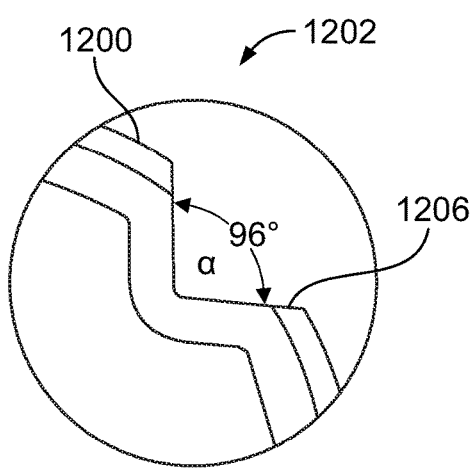
FIG. 32 illustrates a top view of a keying member of a suction cup, according to an embodiment of the present disclosure.

FIG. 32 illustrates a top view of a keying member 1206 of the suction cup 1202, according to an embodiment of the present disclosure. As shown, the keying member 1206 may be an indented feature within the outer wall of the stem 1200. The indentation 1207 may form an angle α that may confirm to an outer surface of a mounting bracket of a component. For example, the angle α may be 96°. Alternatively, the angle α may be greater or less than 96°.

Figure 33:
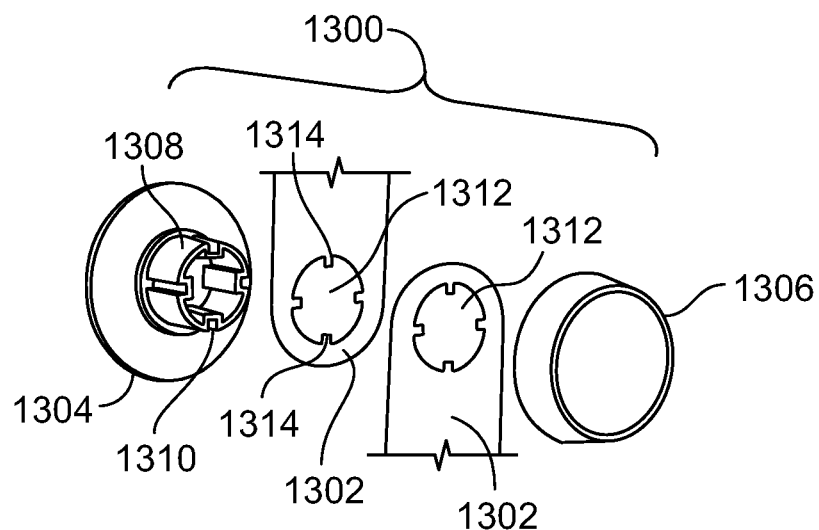
FIG. 33 illustrates a perspective exploded view of a securing assembly in relation to a mounting bracket of a component, according to an embodiment of the present disclosure.

FIG. 33 illustrates a perspective exploded view of a securing assembly 1300 in relation to a mounting bracket 1302 of a component, according to an embodiment of the present disclosure. The securing assembly 1300 may include a suction cup 1304 and a suction securing nut 1306, as described above. The suction cup 1304 may include a stem 1308 having one or more keying members 1310. The mounting bracket 1302 may include a passage or channel 1312 that fits around the stem 1308. Reciprocal key retaining features 1314, such as tabs that conform to the shape of the keying members 1310 and fit therein, extend into the channel 1312. The retaining features 1314 may correspond to the number of keying members 1310. As shown, the keying member 1310 receive the retaining features 1314 and securely maintain the mounting bracket 1302, and therefore the component, in a desired orientation.

Figure 15:
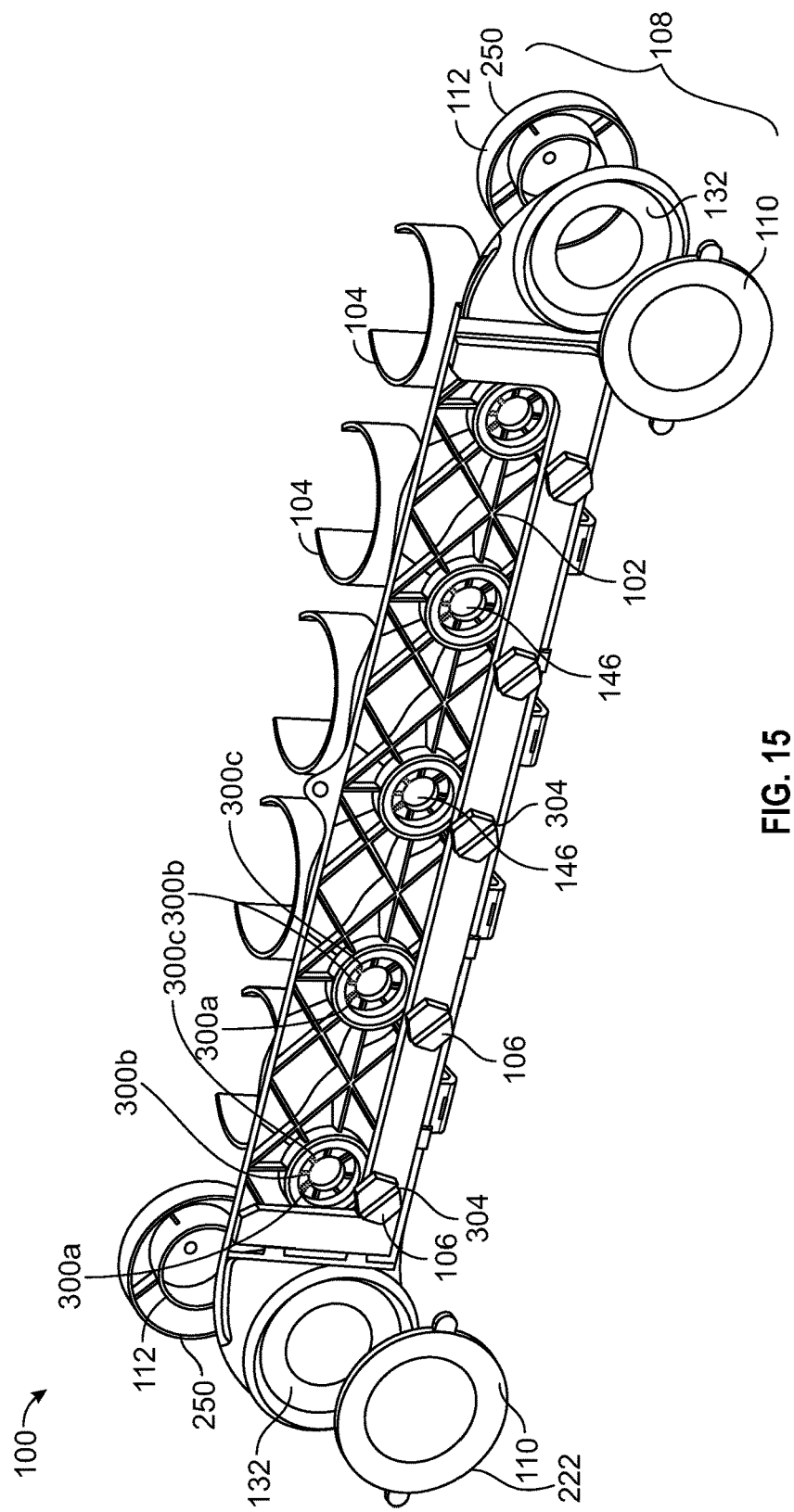
FIG. 15 illustrates a perspective rear exploded view of a product holder system, according to an embodiment of the present disclosure.

FIG. 15 illustrates a perspective rear exploded view of the product holder system 100, according to an embodiment of the present disclosure. As shown in FIG. 15, a plurality of positioning keys, such as slots 300*a*, 300*b*, and 300*c* may connect to the stud-retainer holes 146. The positioning slots 300*a*, 300*b*, and 300*c* may be formed above the stud-retainer holes 146 and may each be at a different radial position. For example, the positioning slot 300*b* may be separated from the positioning slot 300*a* by a radial angle of 15°. Similarly, the positioning slot 300*c* may be separated from the positioning slot 300*b* by a radial angle of 15° (as such, the positioning slot 300*c* may be separated from the positioning slot 300*a* by a radial angle of 30°). Alternatively, the radial angles between neighboring positioning slots may be greater or less than 15°.

The positioning slots 300*a*, 300*b*, and 300*c* are configured to receive and retain the positioning tab 208 of the product holder 104 (shown in FIG. 6) in order to orient the product holder at a desired position, such as a fully upright position, or an angular position. While three positioning slots 300*a*, 300*b*, and 300*c* are shown connecting to each stud-retainer hole 146, it is to be understood that more or less positioning slots 300*a*, 300*b*, and 300*c* may be used. For example, the product holder 104 may not include a positioning tab, and no positioning slots may be formed through the bracket 102.

In order to form the product holder system 100, the product holders 104 are positioned with respect to the bracket 102, such that the bracket mating studs 200 (shown in FIGS. 5 and 6) are positioned within the stud-retainer holes 146. Each product holder 104 may be positioned at a desired position through the positioning tabs 208 being positioned through a desired positioning slot 300*a*, 300*b*, or 300*c*. After the product holders 104 are positioned at desired orientations, the fasteners 106, such as threaded plastic or metal screws, are used to securely connect the product holders 104 to the bracket 102. For example, referring to FIGS. 1 and 15, each fastener 106 may include a threaded shaft 302 connected to an expanded head 304, which is wider or has a greater diameter than the stud-retainer holes 146. The threaded shafts 302 are aligned with the central threaded channels 206 of the product holder 104 (shown in FIG. 6). The fasteners 106 are then engaged to threadably and securely engage the threaded channels 206. As the fasteners 106 continue to be engaged in a securing direction, interior edge portions around the stud-retainer holes 146 are compressively sandwiched between the expanded heads 304 and portions of the product holders 104, thereby securely connecting, such as through a secure clamp fitting, the product holders 104 to the bracket 102. In order to adjust the product holders 104, the fasteners 106 may be loosened or removed, and the product holders 104 may be adjusted to different positions or removed.

After the product holders 104 are secured to the bracket 102, the bracket 102 may then be secured to a surface of a component, such as a door of a refrigerator compartment, through the securing assemblies 108. For example, the suction cups 110 may be positioned on the surface of the component, such that the stems 222 extend through the passages 138 of the securing mounts 128 (shown in FIG. 2) of the bracket 102. Ratchet surfaces 400 may be formed around bases of the stems 222 and may cooperate with the ratchet surfaces 136 (shown in FIG. 2) of the securing mounts 128 to ensure that the suction securing nuts 112 are not overly torqued with respect to the suction cups 110. The complementary ratcheting or torque limiting surfaces are configured to prevent over-tightening.

The suction securing nut 112 may be rotatably engaged with respect to the suction cup 110, as described above, thereby providing a secure connection to the surface of the component. The outer shroud 250 of the suction securing nut 112 and the suctioning base 220 of the suction cup 110 both have wider diameters than the passages 138, and therefore are prevented from passing through the passages 138. Accordingly, as the suction securing nut 112 threadably engages the suction cup 110 to provide a secure suctioning retaining force, interior edge portions of the securing mounts 128, such as the annular rims 132, are compressively sandwiched between the edges of the outer shrouds 250 and the suction cups 110. In this manner, the securing members 108 secure the product holder system 100 to the surface of the component, such as a door of a refrigerated compartment.

Alternatively, the securing members may be various other types of securing members. For example, the securing members may be or include standard suction cups that are linearly urged into the surface of a component. As another alternative, the securing members may be double-sided adhesives that secure the system 100 in position. However, it has been found that the suction cup 110 and the suction securing nut 112 provide a suctioning retaining force of increased strength that is able to hold the system 100 in position even when a large number of products are held by the system 100.

FIG. 16 illustrates a perspective front view of the product holder system 100 secured to an interior surface 500 of a glass door 502 of a refrigerated compartment 504, according to an embodiment of the present disclosure. FIG. 17 illustrates a rear view of the product holder system 100 secured to the interior surface 500 of the glass door 502 of the refrigerated compartment 504, according to an embodiment of the present disclosure. The product holder system 100 may be secured to any surface onto which the securing members 108 may secure. For example, the product holder system 100 may be secured to an outer surface of the glass door 502. Alternatively, the product holder system 100 may be secured to a mirror, a wall, and/or the like. Further, the bracket 102 may be oriented at an angle with respect to horizontal, instead of being positioned in horizontally or vertically. For example, one end 114 may be positioned at a different level than the other end 116.

Figure 18:
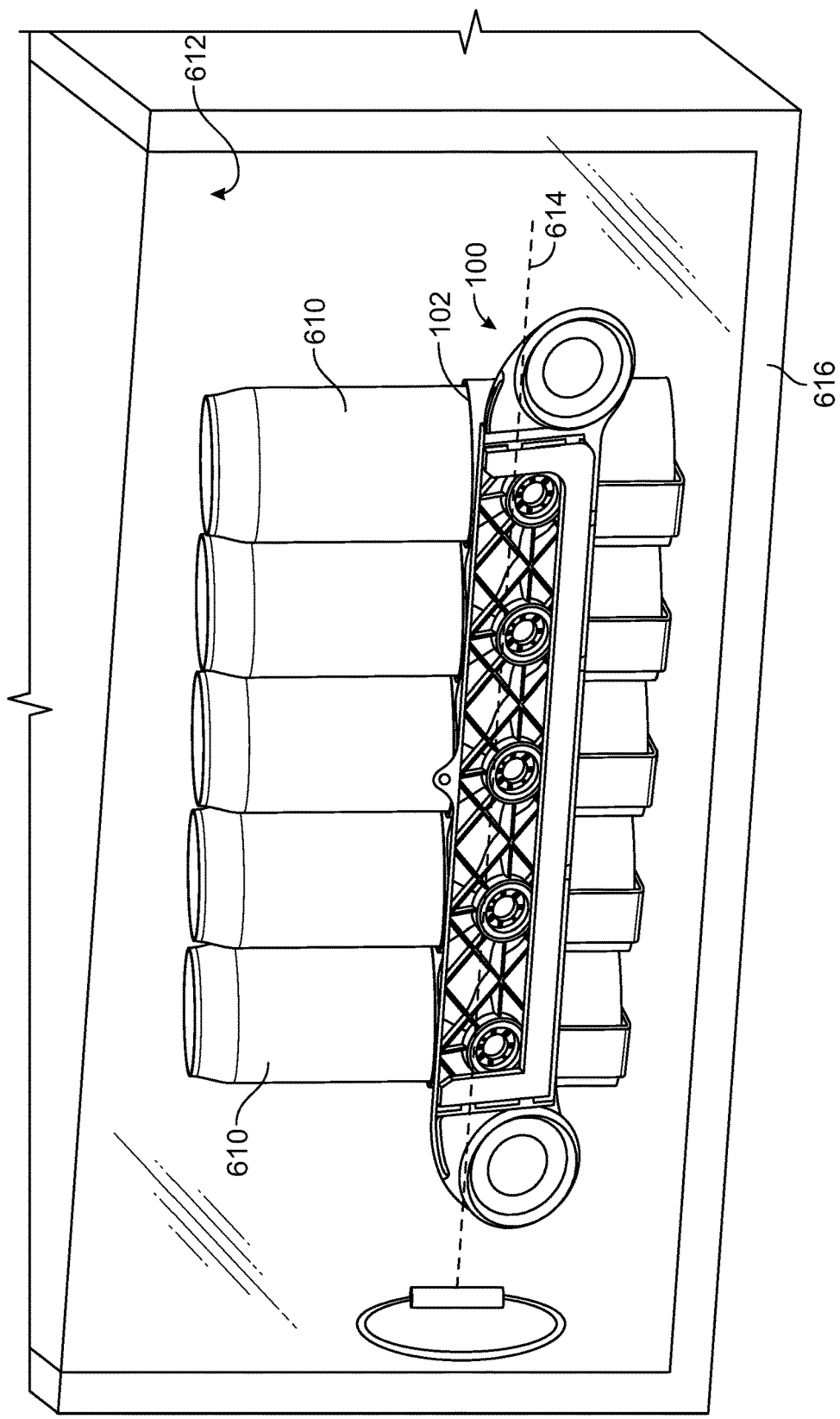
FIG. 18 illustrates a perspective view of a product holder system secured to a surface of a component, according to an embodiment of the present disclosure.

FIG. 18 illustrates a perspective view of a product holder system 100 secured to a surface 600 of a component 602, according to an embodiment of the present disclosure. The component 602 may be a refrigerated compartment, and the surface 600 may be a transparent door of the refrigerated compartment. As shown, the system 100 is holding multiple drink containers 610, such as cans, within an internal refrigerated chamber 612. The system 100 is oriented in a horizontal fashion, such that a longitudinal axis 614 of the bracket 102 is parallel with a plane of a base 616 of the component 602.

Figure 19:
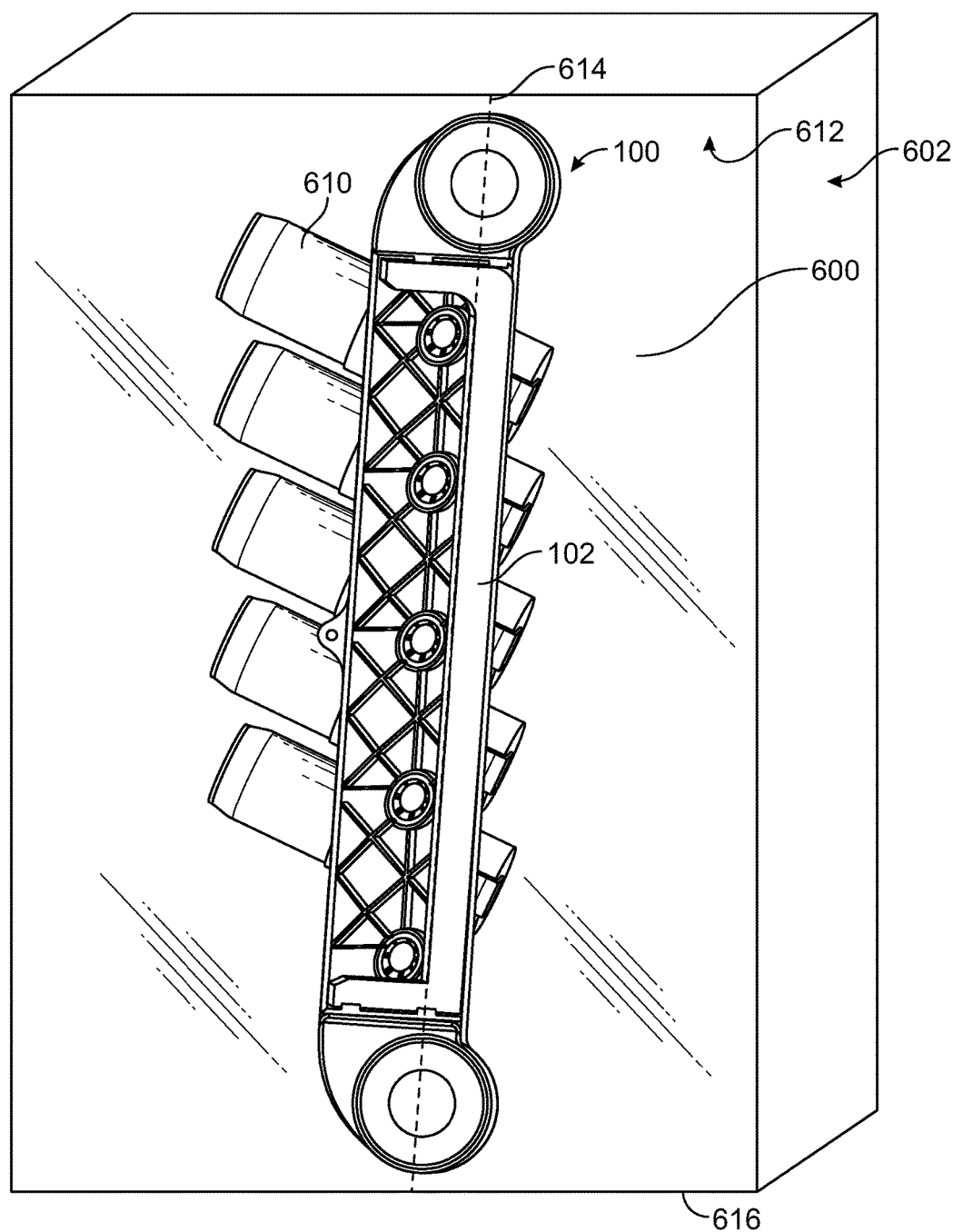
FIG. 19 illustrates a perspective view of a product holder system secured to a surface of a component, according to an embodiment of the present disclosure.

FIG. 19 illustrates a perspective view of the product holder system 100 secured to the surface 600 of the component 602, according to an embodiment of the present disclosure. As shown, the system 100 is holding multiple drink containers 610, such as cans, within the internal refrigerated chamber 612. The system 100 is oriented in a vertical fashion, such that the longitudinal axis 614 of the bracket 102 is perpendicular with a plane of the base 616 of the component 602.

Figure 20:
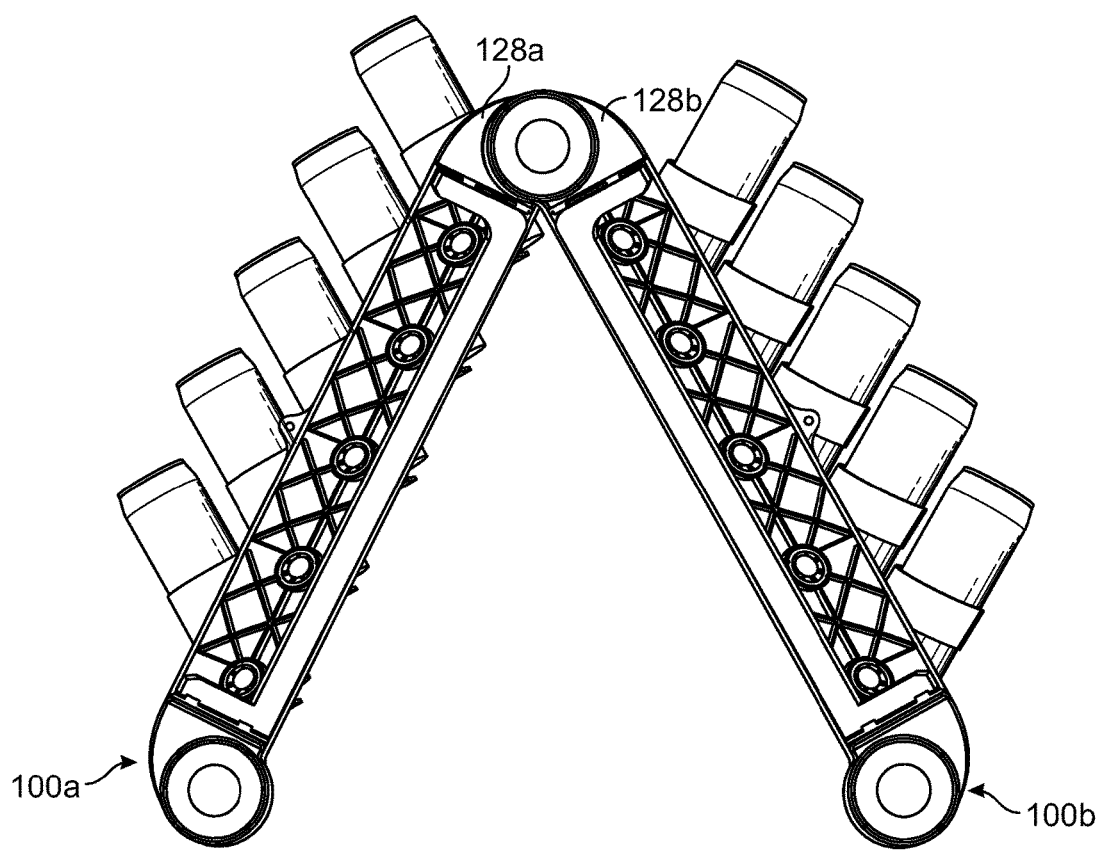
FIG. 20 illustrates a perspective view of product holder systems linked together, according to an embodiment of the present disclosure.

FIG. 20 illustrates a perspective view of product holder systems 100a and 100b linked together, according to an embodiment of the present disclosure. As shown, a securing mount 128a of the system 100a may be aligned and concentric with a securing mount 128b of the system 100b. A securing assembly 108b may link the securing mounts 128a and 128b together, as shown. The systems 100a and 100b may be linked in a linear orientation, or an angled orientation, as shown. As such, embodiments of the present disclosure provide a modular product holder system in which multiple product holder systems may be linked together.

As shown, the system 100a may be pivotally connected to the system 100b. The systems 100a and 100b may be articulated with respect to one another. While the resulting system is shown in an inverted "V" position, the system may be adjusted to an "L" shape or a substantially straight shape, as examples. In at least one embodiment, a suction securing nut and suction cup may be loosened to allow pivoting, and subsequently re-tightened to lock or maintain the overall assembly in a desired position. In other embodiments, the systems 100a and 100b may be pivotal with respect to each other with the suction securing nut and the suction cup in a tightened state.

FIG. 21 illustrates a front view of a bracket 1000, according to an embodiment of the present disclosure. FIG. 22 illustrates a rear view of the bracket 1000. Referring to FIGS. 21 and 22, the bracket 1000 may include notches 1112, 1114, and 1116, with each notch sized to accept a reciprocal retention feature (such as tabs) of a product holder. The notches 1112, 1114, and 1116 may be oriented differently. Thus, if the bracket 1000 is in a horizontal position, a vertical product orientation may be achieved by selecting the notch 1116 and inserting the retention feature of the product holder into the notch 1116. With the bracket 1000 in a horizontal position, a tilted (for example, at an angle between horizontal and vertical) orientation may be achieved by utilizing notch 1112 or notch 1114, depending on the direction or orientation of tilt desired. It may be noted that different product orientations may be achieved in various embodiments via positioning of the system on a surface (for example, with the bracket 1000 vertical instead of horizontal) and/or via providing additional or alternative notches having different orientations from those shown in FIGS. 21 and 22.

Figure 23:
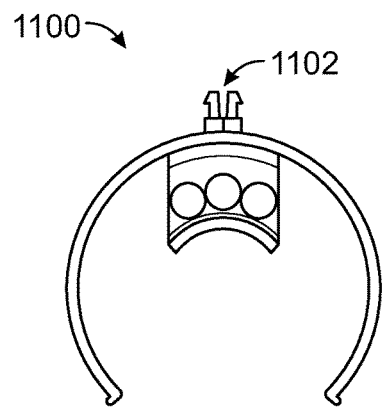
FIG. 23 illustrates a top view of a product holder, according to an embodiment of the present invention.
Figure 24:
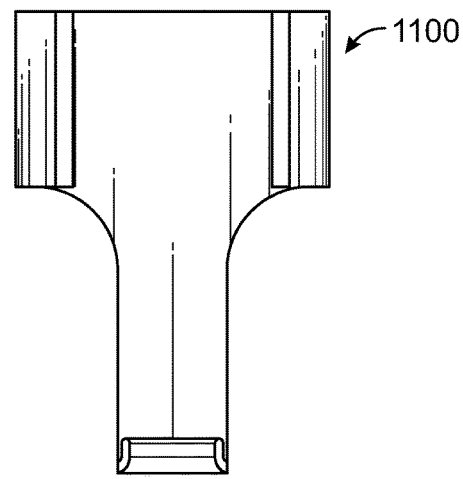
FIG. 24 illustrates a front view of a product holder, according to an embodiment of the present invention.
Figure 25:
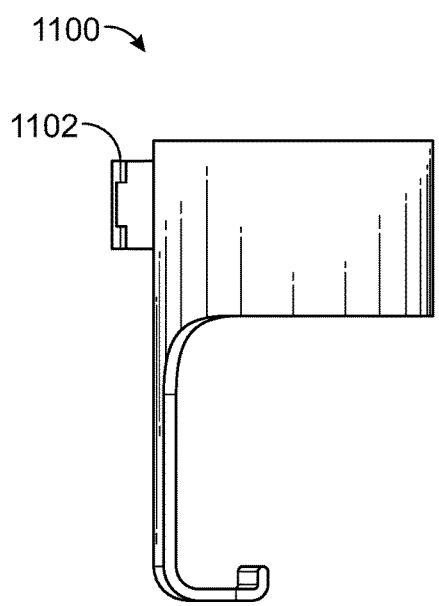
FIG. 25 illustrates a side view of a product holder, according to an embodiment of the present invention.
Figure 26:
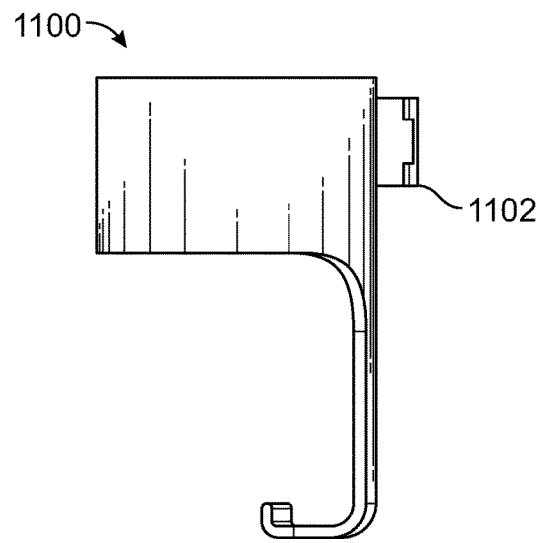
FIG. 26 illustrates a side view of a product holder, according to an embodiment of the present invention.
Figure 27:
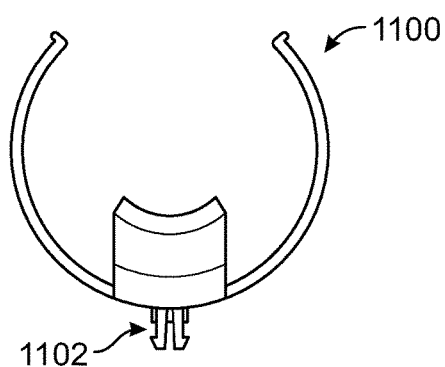
FIG. 27 illustrates a bottom view of a product holder, according to an embodiment of the present invention.
Figure 28:
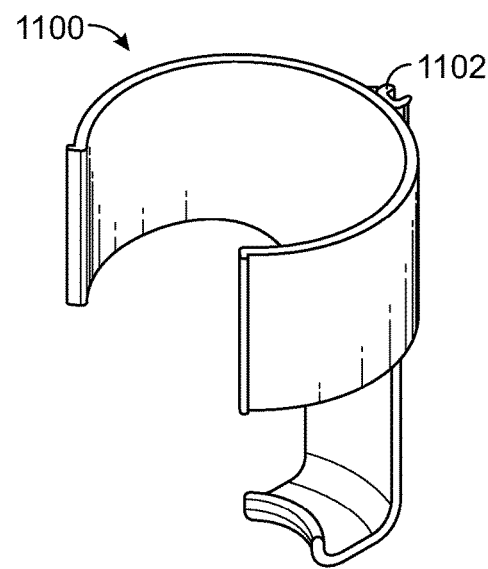
FIG. 28 illustrates a perspective top view of a product holder, according to an embodiment of the present invention.

FIG. 23 illustrates a top view of a product holder 1100, according to an embodiment of the present invention. FIG. 24 illustrates a front view of the product holder 1100. FIG. 25 illustrates a side view of the product holder 1100. FIG. 26 illustrates a side view of the product holder 1100. FIG. 27 illustrates a bottom view of the product holder 1100. FIG. 28 illustrates a perspective top view of the product holder 1100. Referring to FIGS. 23-28, the product holder 1100 is similar to the product holders 104, except that a retention feature 1102, such as a clip, may include a resiliently biasable member that may be inserted into a notch (such as the notches shown in FIGS. 21 and 22) and retained via a resilient force exerted by the resiliently biasable member against a surface of the notch and/or via a barb disposed toward an end of the resiliently biasable member.

The depicted retention feature 1102 may be configured as a resiliently biasable member include two arms or prongs having barbs disposed along an end configured to be inserted into a notch of the bracket 1000 (shown in FIGS. 21 and 22). Thus, to change orientation of a product, the product holder 1100 may be removed from a first notch and coupled via the retention feature 1102 to a second notch having a different orientation than the first notch.

Figure 34:
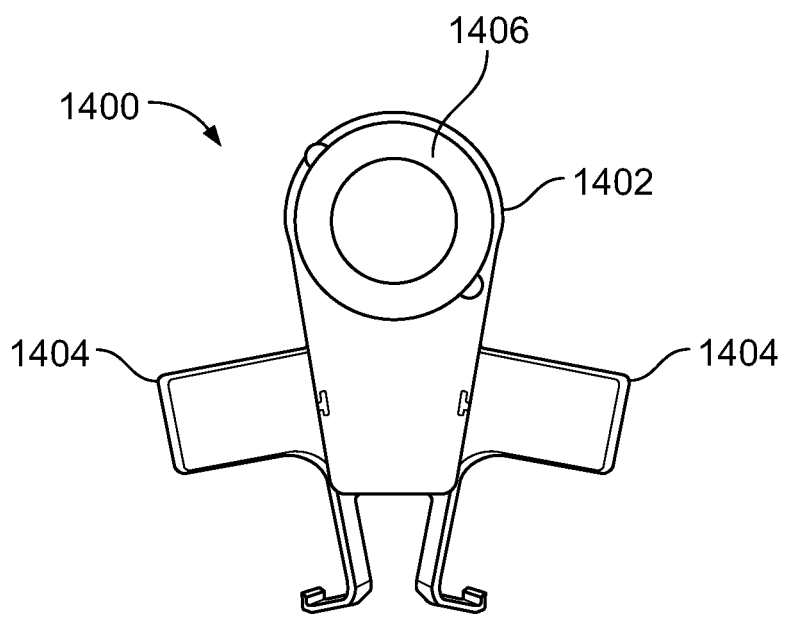
FIG. 34 illustrates a front view of a product holder system, according to an embodiment of the present disclosure.

FIG. 34 illustrates a front view of a product holder system 1400, according to an embodiment of the present disclosure. The product holder system 1400 includes a main body 1402 that holds two products holders 1404. For example, a product holder 1404 may be secured to each side of the main body 1402. A securing member 1406, such as any of those described above, is used to secure the product holder to a surface of a compartment, for example.

Figure 35:
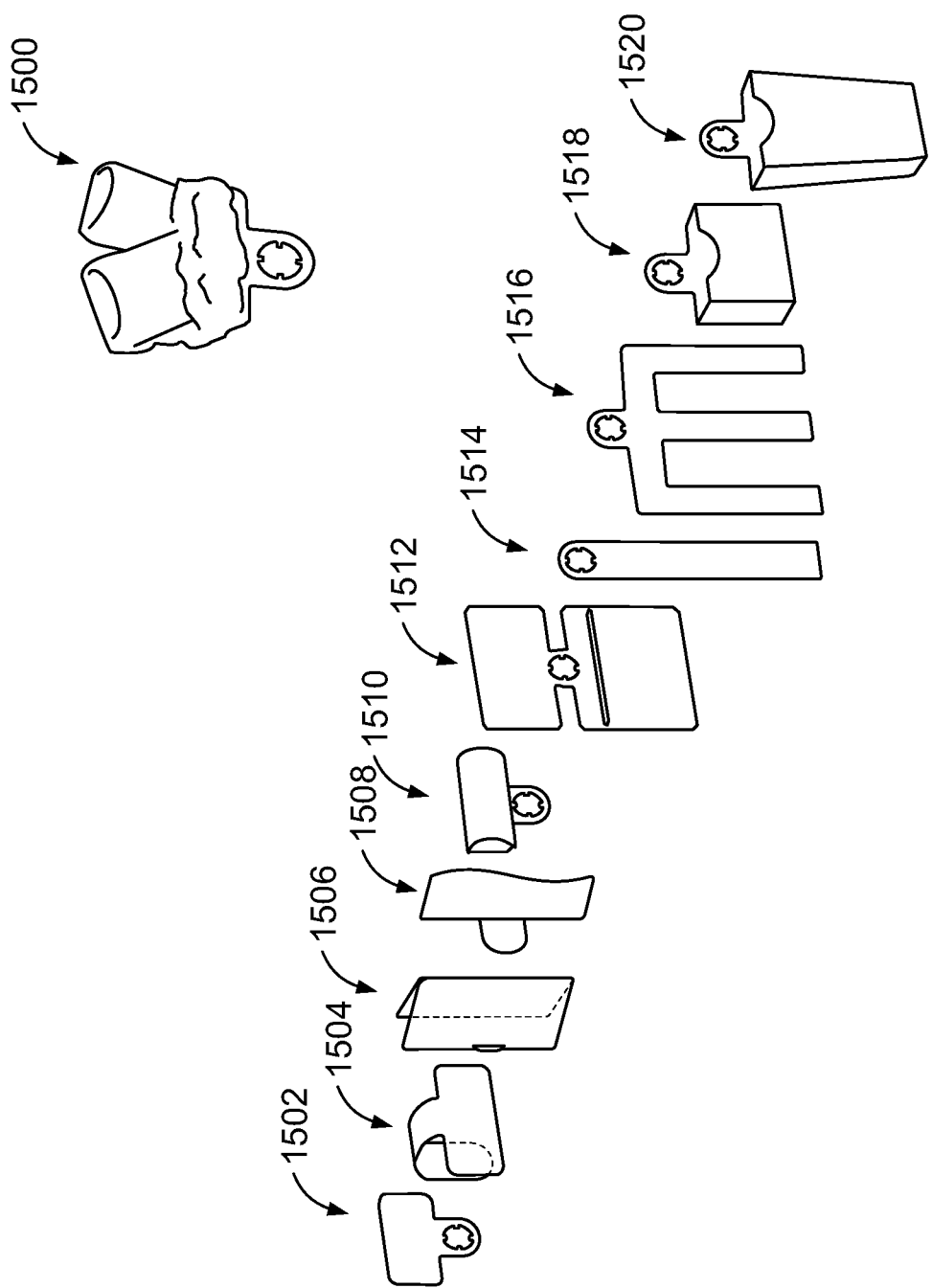
FIG. 35 illustrates perspective views of various components that may be secured to a surface of a structure through a securing member, according to embodiments of the present disclosure.

FIG. 35 illustrates perspective views of various components 1500-1520 that may be secured to a surface of a structure through a securing member, according to embodiments of the present disclosure. Any of the securing members described above may be used to secure the components 1500-1520 to the surface of the structure. In particular, securing members having keying members, as described above, may be used to orient the components at desired positions. As shown, the components 1500-1520 may be configured to carry beverages, carry advertisements, business cards, or the like. The securing members described above may be used to secure a variety of components to a surface of a structure.

Figure 36:
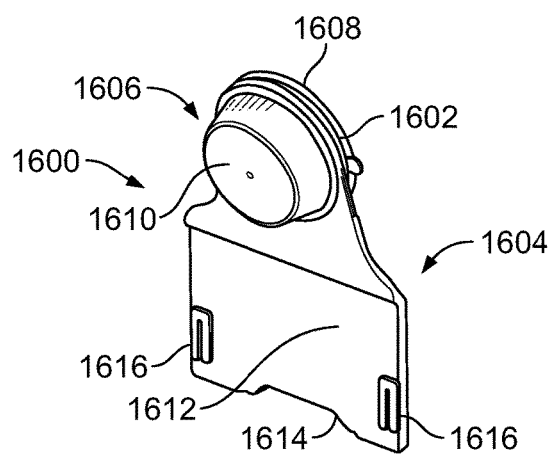
FIG. 36 illustrates a perspective view of a component holder system, according to an embodiment of the present disclosure.
Figure 37:
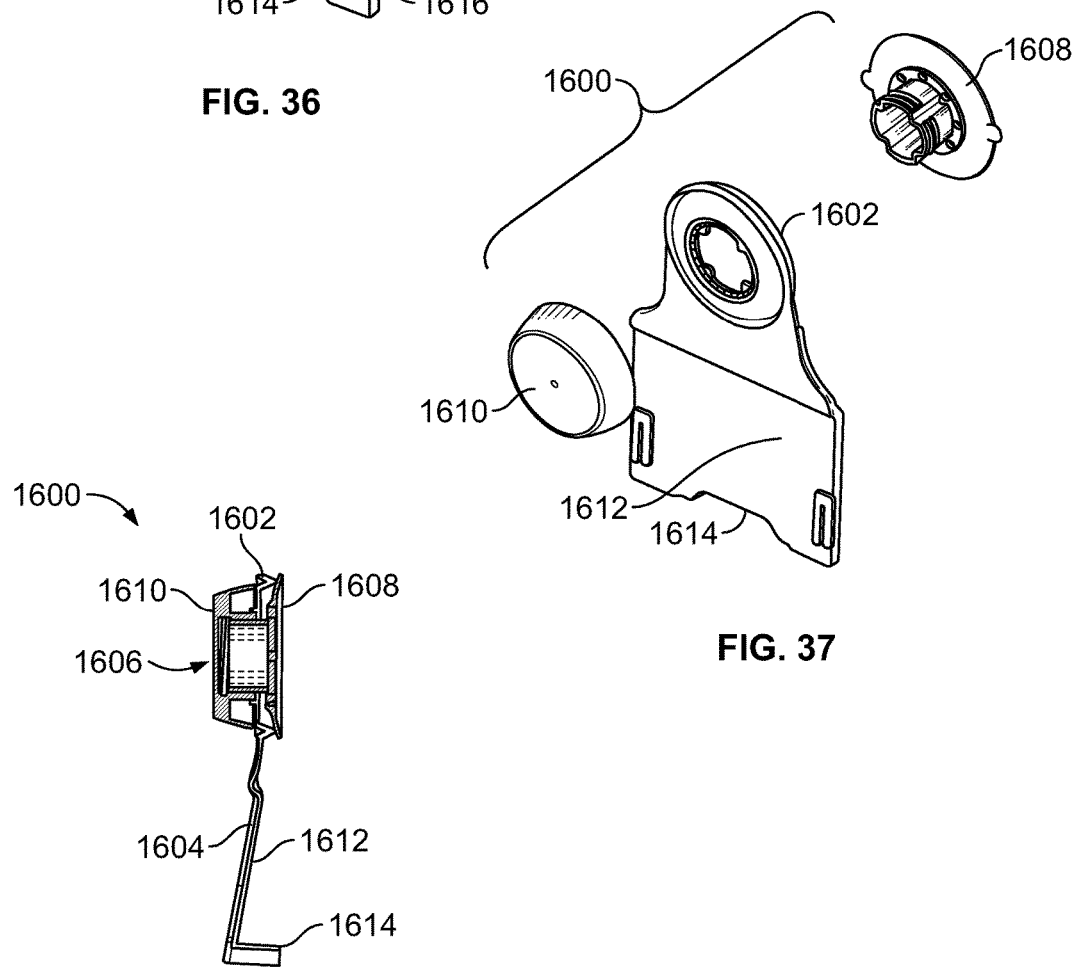
FIG. 37 illustrates a perspective exploded view of a component holder system, according to an embodiment of the present disclosure.
Figure 38:
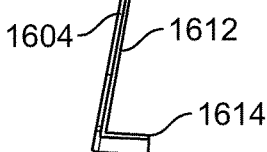
FIG. 38 illustrates a lateral view of a component holder system, according to an embodiment of the present disclosure.

FIG. 36 illustrates a perspective view of a component holder system 1600, according to an embodiment of the present disclosure. FIG. 37 illustrates a perspective exploded view of the component holder system 1600. FIG. 38 illustrates a lateral view of the component holder system 1600. Referring to FIGS. 36-38, the component holder system

1600 includes a bracket 1602 of a component 1604, such as a cardholder. The component 1604 is configured to be secured to a surface of a structure through a securing member 1606, which may include a suction cup 1608 and a suction-securing nut 1610, such as described above. The component 1604 may include a support wall 1612 connected to a base 1614. The support wall 1612 and/or the base 1614 may include one or more retaining clips 1616, which may be used to retain product sheets, such as cards, advertisements, coupons, or the like.

Referring to all of the Figures, the product holder systems described above may be modular. For example, brackets of the same or different sizes may be linked together, as described above. Further, product holders and securing assemblies may be removably secured to each product holder system. As such, a wide variety of configurations and orientations may be achieved through the use of modular brackets, product holders, and securing assemblies.

The product holders may be sized and shaped as shown. Alternatively, the product holders may be sized and shaped differently to accommodate receptacles that hold various products. For example, the product holders may be sized and shaped to hold non-cylindrical cans, bottles, or the like.

In at least one embodiment, two brackets (or two portions of a main body or bracket) may share a securing assembly. The two brackets may be articulated relative to one another to form a desired shape, such as a "V" shape, or, as another example, an "L" shape. The various shapes may be utilized to provide a desired appearance and/or to maximize available space on a door to which the product holder system is mounted. As one more example, differently sized beverage holders may be used additionally or alternatively to provide for retention and display of a variety of sizes and/or shapes of beverage containers.

Various aspects of the systems may be molded, for example, from plastics such as polycarbonate. In some embodiments, the plastic may be tinted or colored, for example, to match or complement a color of product container to be retained and displayed by the product holder system.

In at least one embodiment, the securing members may include a suction cup and a suction securing nut. The suction securing nut and the suction cup may be engaged to a first, lower, level of tightness to initially secure together, and subsequently tightened to a second, higher, level of tightness after the product holder system has been positioned (for example, with the suction cups against a surface to which the system mounts). The tightening performed after positioning on the surface may act to provide additional or improved suction. The suction securing nut may be sized and configured to be tightened by the fingers of a hand (for example, without additional tools), and to have a torque limiting mechanism (such as a ratcheting surface) to prevent overtightening. The system may also retain a sign, such as in the form of a graphics sheath, which may include graphics (for example, an advertisement, product identification, product description, or the like) on a graphics face oriented toward the surface, such as glass door, to which the system is secured.

Embodiments of the present disclosure provide reliable and flexible product retention and display systems. Embodiments of the present disclosure provide modular systems that may be mounted to a surface, such as an interior surface of a glass door for a cooler or refrigerator.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A product holder that is configured to removably retain a product, wherein the product holder comprises:
   a support base that is configured to support a bottom portion of the product;
   an extension strap having first and second ends, wherein a first end is connected to the support base, wherein the extension strap comprises an arcuate bowed surface that conforms to an outer curved surface of a can or bottle;
   a cradling sleeve connected to a second end of the extension strap, wherein the cradling sleeve includes opposed resilient arms securable around at least a portion of an outer surface of the product; and a bracket-mating stud including a threaded channel and a positioning tab radially extending from the bracket-mating stud, wherein the positioning tab is configured to be received and retained by a reciprocal positioning slot formed in relation to a fastener through-hole formed in a bracket.

2. The product holder of claim 1, wherein the bracket-mating stud further includes a cylindrical post that defines the threaded channel.

3. The product holder of claim 1, wherein the threaded channel is configured to receive and retain a threaded shaft of a fastener.

4. The product holder of claim 1, wherein the product holder is formed of plastic.

5. The product holder of claim 1, wherein the support base comprises a flat beam connected to an upturned distal tip.

6. A product holder that is configured to removably retain a product, wherein the product holder comprises:
    a support base;
    an extension strap connected to the support base, wherein the extension strap comprises an arcuate bowed surface that conforms to an outer curved surface of a can or bottle;
    a cradling sleeve connected to the extension strap; and
    a bracket-mating stud including a threaded channel and a positioning tab radially extending from the bracket-mating stud, wherein the positioning tab is configured to be received and retained by a reciprocal positioning slot formed in relation to a fastener through-hole formed in a bracket.

7. The product holder of claim 6, wherein the bracket-mating stud further includes a cylindrical post that defines the threaded channel.

8. The product holder of claim 6, wherein the threaded channel is configured to receive and retain a threaded shaft of a fastener.

9. The product holder of claim 6, wherein the cradling sleeve includes opposed resilient arms securable around at least a portion of an outer surface of the product.

10. The product holder of claim 6, wherein the product holder is formed of plastic.

11. The product holder of claim 6, wherein the support base comprises a flat beam connected to an upturned distal tip.

12. A product holder that is configured to removably retain a product, wherein the product holder comprises:
    a support base that is configured to support a bottom portion of the product;
    an extension strap having first and second ends, wherein a first end is connected to the support base, wherein the extension strap comprises an arcuate bowed surface having a radius of curvature that conforms to an outer curved surface of a can or bottle, wherein the arcuate bowed surface is curved between lateral edges in relation to a central longitudinal axis;
    a cradling sleeve connected to a second end of the extension strap, wherein the cradling sleeve includes opposed resilient arms securable around at least a portion of an outer surface of the product; and
    a bracket-mating stud including a cylindrical post defining a threaded channel, and a positioning tab radially extending from the bracket-mating stud, wherein the threaded channel is configured to receive and retain a threaded shaft of a fastener, and wherein the positioning tab is configured to be received and retained by a reciprocal positioning slot formed in relation to a fastener through-hole formed in a bracket.

13. The product holder of claim 12, wherein the product holder is formed of plastic.

14. The product holder of claim 12, wherein the support base comprises a flat beam connected to an upturned distal tip.

15. The product holder of claim 1, wherein the cradling sleeve has a first width and the extension strap has a second width that is less than the first width, and wherein the product holder is devoid of sidewalls between the cradling sleeve and the extension strap.

16. The product holder of claim 6, wherein the cradling sleeve has a first width and the extension strap has a second width that is less than the first width, and wherein the product holder is devoid of sidewalls between the cradling sleeve and the extension strap.

17. The product holder of claim 1, wherein the arcuate bowed surface has a radius of curvature that conforms to the outer curved surface of the can or bottle.

18. The product holder of claim 1, wherein the arcuate bowed surface is curved between lateral edges in relation to a central longitudinal axis.

19. The product holder of claim 6, wherein the arcuate bowed surface has a radius of curvature that conforms to the outer curved surface of the can or bottle.

20. The product holder of claim 6, wherein the arcuate bowed surface is curved between lateral edges in relation to a central longitudinal axis.

* * * * *